US012491057B2

(12) United States Patent
Raby et al.

(10) Patent No.: US 12,491,057 B2
(45) Date of Patent: Dec. 9, 2025

(54) FORCE SENSOR SYSTEM

(71) Applicant: Solventum Intellectual Properties Company, Maplewood, MN (US)

(72) Inventors: Richard E. Raby, Lino Lakes, MN (US); Eric S. Hansen, Apex, NC (US); Joseph C. Fallo, Moore, MN (US); Michael K. Domroese, Woodbury, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 860 days.

(21) Appl. No.: 17/762,968

(22) PCT Filed: Oct. 20, 2020

(86) PCT No.: PCT/IB2020/059869
§ 371 (c)(1),
(2) Date: Mar. 23, 2022

(87) PCT Pub. No.: WO2021/079275
PCT Pub. Date: Apr. 29, 2021

(65) Prior Publication Data
US 2022/0361996 A1 Nov. 17, 2022

Related U.S. Application Data

(60) Provisional application No. 62/925,146, filed on Oct. 23, 2019.

(51) Int. Cl.
*A61C 19/04* (2006.01)
*A61C 13/34* (2006.01)
*G01L 1/22* (2006.01)

(52) U.S. Cl.
CPC .............. *A61C 19/04* (2013.01); *A61C 13/34* (2013.01); *G01L 1/22* (2013.01)

(58) Field of Classification Search
CPC ..... G01L 1/2218; G01L 1/246; G01L 5/1627; G01L 1/2212; G01L 1/2206; G01L 1/205; A61C 9/008; A61C 9/002; A61C 13/34
See application file for complete search history.

(56) References Cited

U.S. PATENT DOCUMENTS 3,535,923 A * 10/1970 Bossi ................. G01L 1/26
73/862.642
3,855,857 A * 12/1974 Claycomb ............... E21B 47/20
73/152.59

(Continued)

FOREIGN PATENT DOCUMENTS

CN 100351622 C * 11/2007
CN 103040535 4/2013

(Continued)

OTHER PUBLICATIONS

English Translation of CN 100351622 (Year: 2005).*
International Search report for PCT International Application No. PCT/IB2020/059869 mailed on Dec. 17, 2020, 4 pages.

*Primary Examiner* — Tran M. Tran

(57) ABSTRACT

Systems and techniques are described for determining at least one of a translational force or a rotational force applied by a dental appliance to a tooth or teeth of a patient. A system includes model teeth configured to represent a portion of a dental arch and receive a dental appliance, a post extending from a first end coupled to a respective tooth to a second end coupled to a base, at least one strain gauge integrally formed on a surface of the post between the first end and the second end, and processor communicatively coupled to the at least one strain gauge and configured to determine at least one of a translational force or a rotational force applied by the dental appliance to the respective tooth.

20 Claims, 12 Drawing Sheets

FIG. 2

(56) References Cited

U.S. PATENT DOCUMENTS

| | | | | |
|---|---|---|---|---|
| 3,914,993 A | * | 10/1975 | Babcock | G01L 1/2218 73/767 |
| 4,162,628 A | * | 7/1979 | Oetjen | G01G 19/021 73/862.622 |
| 4,789,035 A | * | 12/1988 | Hamilton | G01L 1/2218 73/862.632 |
| 5,055,041 A | * | 10/1991 | Eckland | A61C 19/04 433/56 |
| 5,791,350 A | | 8/1998 | Morton | |
| 6,068,394 A | * | 5/2000 | Dublin, Jr. | G01L 5/162 73/152.01 |
| 6,120,287 A | * | 9/2000 | Chen | A61C 7/02 433/2 |
| 6,227,851 B1 | * | 5/2001 | Chishti | A61C 9/002 433/53 |
| 6,845,175 B2 | | 1/2005 | Kopelman | |
| 6,888,074 B2 | * | 5/2005 | Haggstrom | G01L 1/2218 73/862.622 |
| 7,027,642 B2 | | 4/2006 | Rubbert | |
| 7,033,327 B2 | | 4/2006 | Raby | |
| 7,234,937 B2 | | 6/2007 | Sachdeva | |
| 7,481,121 B1 | * | 1/2009 | Cao | A61C 7/00 73/862.044 |
| 7,543,511 B2 | | 6/2009 | Kimura | |
| 7,824,183 B2 | * | 11/2010 | Matsuda | A61C 13/0004 33/513 |
| 7,837,904 B2 | | 11/2010 | Hedge | |
| 8,503,834 B2 | * | 8/2013 | Arkwright | G01D 5/35316 73/862.471 |
| 8,943,886 B2 | | 2/2015 | Park | |
| 8,943,902 B2 | * | 2/2015 | Bosscher | G01L 1/2281 73/862.041 |
| 9,127,997 B2 | * | 9/2015 | Mehlmauer | G01L 5/1627 |
| 9,259,295 B2 | * | 2/2016 | Christoff | A61C 7/08 |
| 9,453,773 B2 | | 9/2016 | Choi | |
| 9,605,993 B2 | * | 3/2017 | Ziebart | G01G 3/1414 |
| 9,782,238 B2 | * | 10/2017 | Kopelman | A61C 13/34 |
| 10,488,183 B1 | * | 11/2019 | Wolf | G01L 1/246 |
| 10,488,281 B2 | * | 11/2019 | Burrow | G01L 5/1627 |
| 10,578,501 B2 | * | 3/2020 | Kim | G01L 5/1627 |
| 10,620,061 B2 | * | 4/2020 | H | G01L 1/26 |
| 10,620,067 B2 | | 4/2020 | Doll | |
| 10,996,121 B2 | * | 5/2021 | Burrow | G01G 3/14 |
| 11,092,499 B2 | * | 8/2021 | Tondolo | G01L 9/0045 |
| 11,555,750 B2 | * | 1/2023 | Westergaard | G01L 1/2225 |
| 11,752,643 B2 | * | 9/2023 | Nitz | B25J 13/085 74/490.06 |
| 11,992,383 B2 | * | 5/2024 | Cao | A61C 7/20 |
| 12,025,436 B2 | * | 7/2024 | Shen | G01B 7/16 |
| 2009/0030347 A1 | | 1/2009 | Cao | |
| 2009/0030348 A1 | | 1/2009 | Kimura | |
| 2009/0217769 A1 | * | 9/2009 | Roberts | G01M 5/0041 73/800 |
| 2016/0349122 A1 | * | 12/2016 | Bogert | G01M 13/02 |
| 2020/0100859 A1 | * | 4/2020 | Shen | A61B 90/06 |

FOREIGN PATENT DOCUMENTS

| | | |
|---|---|---|
| CN | 103860284 | 6/2014 |
| CN | 103961188 | 8/2014 |
| CN | 104107094 | 10/2014 |
| DE | 102007017862 | 10/2008 |
| DE | 102010026120 | 1/2012 |
| EP | 1524509 | 4/2005 |
| EP | 3454032 | 3/2019 |
| EP | 3491355 | 6/2019 |
| EP | 3332235 | 3/2020 |
| FR | 3001540 | 8/2014 |
| JP | 2767480 | 6/1998 |
| JP | 2000009564 | 1/2000 |
| JP | 2004045044 | 2/2004 |
| KR | 20040098325 | 11/2004 |
| KR | 20130032073 | 4/2013 |
| WO | WO 1998-012984 | 4/1998 |
| WO | WO 2007-084727 | 7/2007 |
| WO | WO 2012-155282 | 11/2012 |
| WO | WO 2018-035838 | 3/2018 |

* cited by examiner

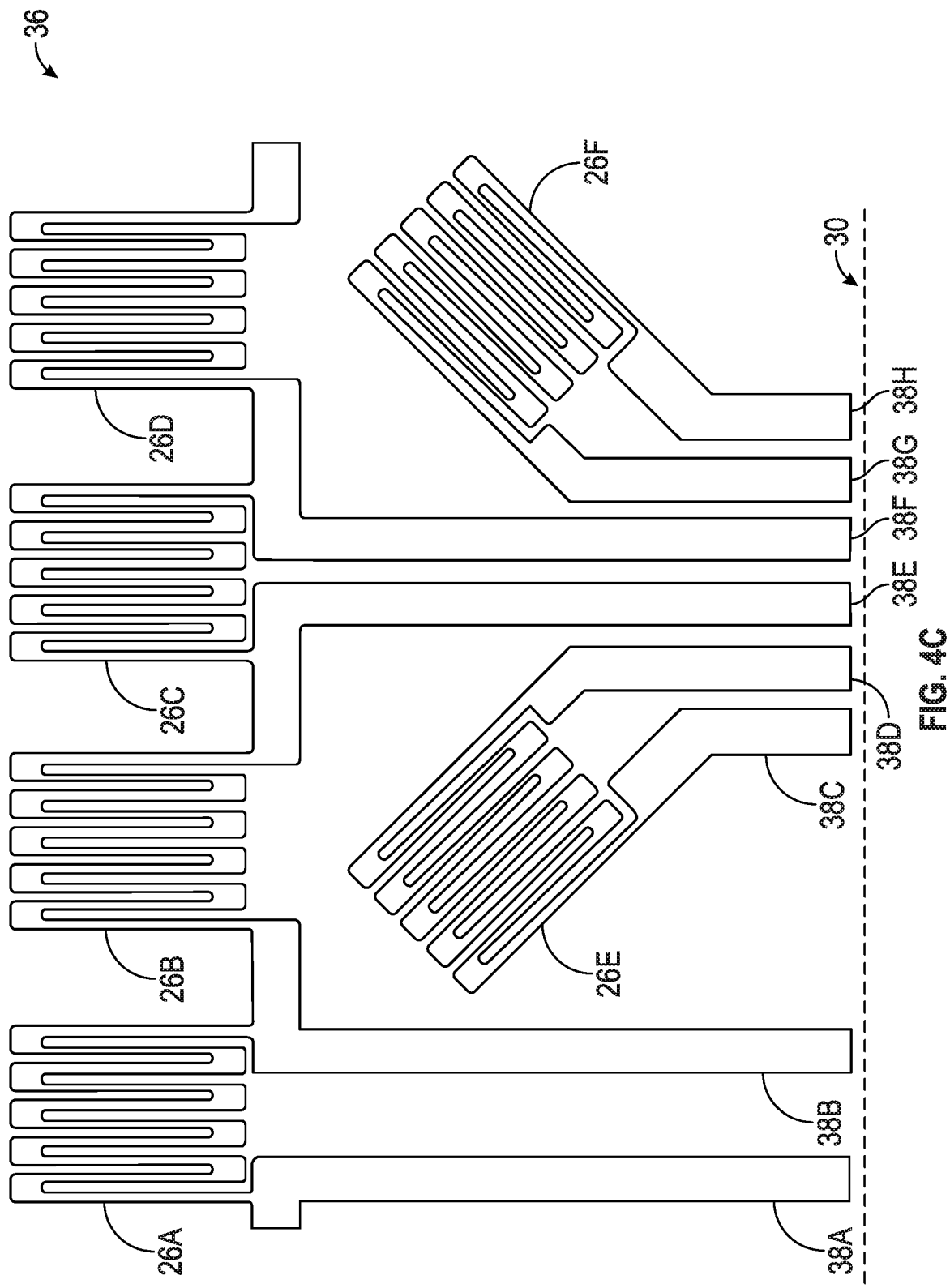

FORCE SENSOR SYSTEM

CROSS REFERENCE TO RELATED APPLICATIONS

This application is a national stage filing under 35 U.S.C. 371 of PCT/IB2020/059869, filed 20 Oct. 2020, which claims the benefit of U.S. Provisional Application No. 62/925,146, filed 23 Oct. 2019, the disclosures of which are incorporated by reference in their entireties herein.

TECHNICAL FIELD

The present disclosure relates to systems for measuring forces applied to relatively small objects, such as teeth of a model dental arch.

BACKGROUND

Dental practitioners often utilize a set of dental appliances adjusted over multiple iterations to re-shape or restore a patient's dental anatomy over time. For example, a dental appliance may apply a selected force to one or more portions of teeth of the dental arch of the patient to cause the teeth to move over time from a maloccluded position toward a target position, e.g., a desired dental anatomy. After some tooth movement has occurred, the dental appliance may need to be adjusted to further move the teeth to the final target position. The selected force applied to the teeth during these iterations may be determined based on a model of the patient's dental anatomy that is modified to represent incremental changes toward the desired dental anatomy. In some examples, a dental appliance used in a particular iteration may not achieve the selected force due to, for example, interactions between neighboring teeth caused by deformation of the dental appliance or compromised engagement of the dental appliance with the teeth, particularly as the teeth move over time from their maloccluded positions toward their target positions.

SUMMARY

The disclosure relates to systems and techniques for measuring forces applied to an object, such as teeth of a model dental arch. In some examples, the disclosure describes a system that includes a plurality of model teeth, at least one force sensor, a base, and a processor. The plurality of model teeth are configured to represent at least a portion of a dental arch of a patient and receive a dental appliance. The at least one force sensor includes a post extending from a first end to a second end along a central longitudinal axis. The first end of the post is coupled to a respective tooth of the plurality of model teeth. The at least one force sensor also includes at least one strain gauge integrally formed on a surface of the post between the first end and the second end. The at least one strain gauge is configured to generate a signal in response to a deflection of the post. The base defines at least one recess coupled to the second end of the post. The processor is communicatively coupled to the at least one strain gauge. The processor is configured to determine, based on the signal from the at least one strain gauge, at least one of a translational force or a rotational force applied by the dental appliance to the respective tooth of the plurality of model teeth.

In some examples, the disclosure describes a method that includes positioning a dental appliance on a plurality of model teeth that are configured to represent at least a portion of a dental arch of a patient. A respective tooth of the plurality of model teeth is coupled to a force sensor that includes a post extending from a first end to a second end along a central longitudinal axis and at least one strain gauge integrally formed on a surface of the post between the first end and the second end. The first end of the post is coupled to the respective tooth. The second end of the post is coupled to a recess of a base. The at least one strain gauge is configured to generate a signal in response to a deflection of the post. The method also includes receiving, by a processor communicatively coupled to the at least one strain gauge, the signal generated by the at least one strain gauge based on the deflection of the post. The method also includes determining, by the processor based on the signal, at least one of a translational force or a rotational force applied by the dental appliance to the respective tooth of the plurality of model teeth.

In some examples, the disclosure describes a force sensor that includes a post and a plurality of strain gauges. The post includes a nonconductive material and extends from a first end to a second end along a central longitudinal axis. The plurality of strain gauges include a conductive material integrally formed on a surface of the post between the first end and the second end. The plurality of strain gauges are configured to detect at least one of a translation or a rotation of the post.

In some examples, the disclosure describes a method the includes forming a post from a nonconductive material, the post extending from a first end to a second end along a central longitudinal axis. The method also includes plating the post with a conductive material to define a conductive surface. The method also includes removing at least a portion of the conductive surface to define at least one electrically resistive strain gauge between the first end and the second end of the post.

The details of one or more examples are set forth in the accompanying drawings and the description below. Other features, objects, and advantages will be apparent from the description and drawings, and from the claims.

BRIEF DESCRIPTION OF THE FIGURES

FIG. 4C is a conceptual diagram illustrating an example sensor pattern of the strain gauges illustrated in FIGS. 4A and 4B, illustrated in two-dimensional "unrolled" form.

DETAILED DESCRIPTION

Figure 1:
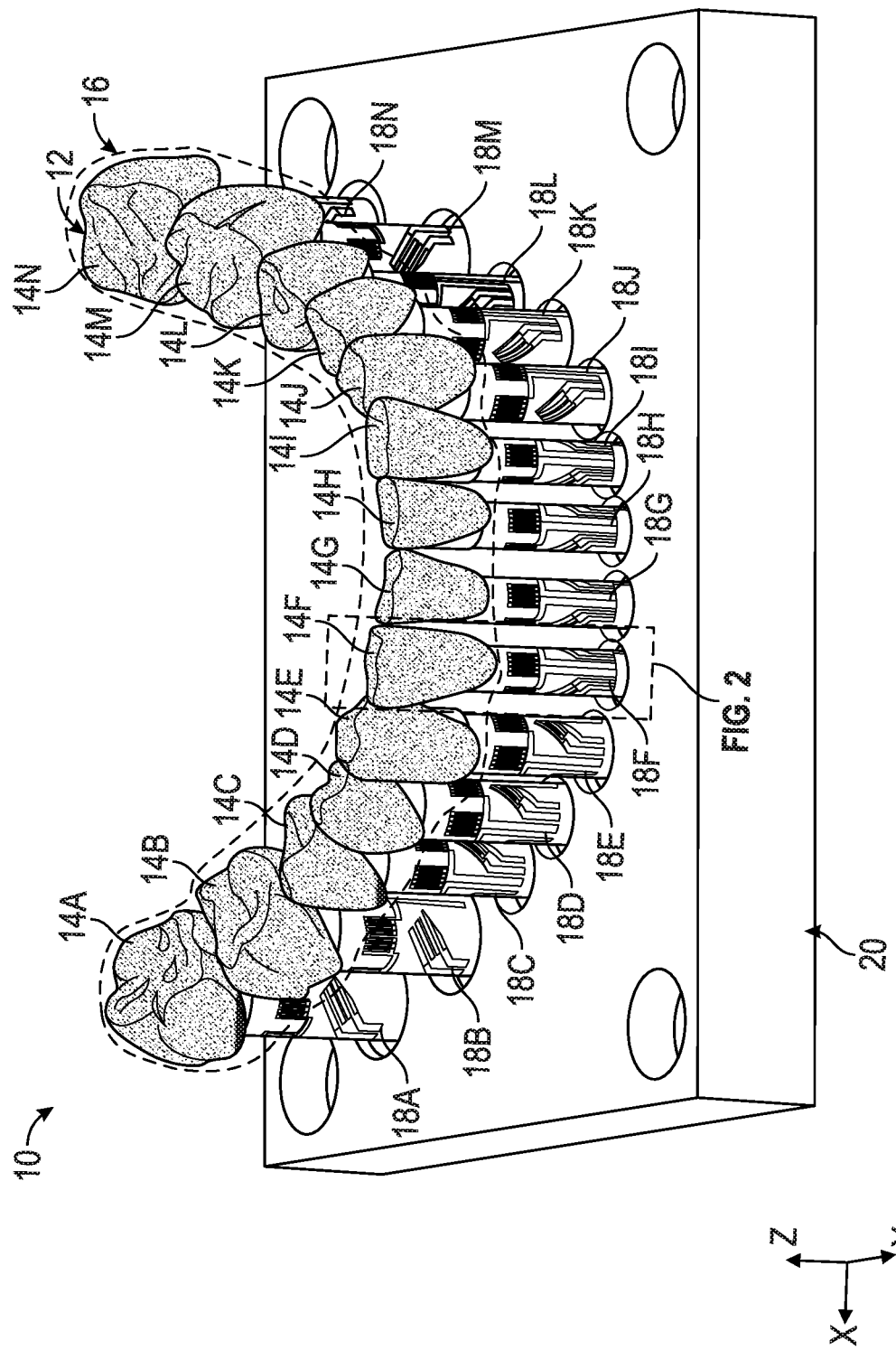
FIG. 1 is a conceptual diagram illustrating an example force sensor system.

The disclosure describes systems and techniques to determine at least one of a translational force or a rotational force applied by a dental appliance to a respective tooth of the plurality of model teeth or, in some examples, by neighboring teeth to the respective tooth. An example system may include a model dental arch, force sensors coupled to each tooth of the model, and a processor communicatively coupled to the force sensors. The model dental arch may be configured to receive a dental appliance, such as an aligner tray. When positioned on the model dental arch, the dental appliance may apply a force to one or more teeth of the model. The force may be transmitted through the teeth of the model to the force sensors. For example, the force sensors may include a post extending from a first end to a second end along a central longitudinal axis. The first end of a respective post may be coupled to a respective tooth of the plurality of model teeth. The second end of a respective post may be coupled to a base such that deflection of the force sensor is concentrated to a region between the first end and the second end of the post. A plurality of strain gauges may be integrally formed on a surface of the post between the first end and the second end. Each of the strain sensors may be communicatively coupled to one or more processors that are configured to determine, based on a measured deflection from each of the strain gauges, at least one of a translational force or a rotational force applied by the dental appliance to the respective tooth of the plurality of model teeth.

The systems and techniques described herein may provide certain advantages. For example, by determining at least one of a translational force or a rotational force applied by the dental appliance to the respective tooth of the plurality of model teeth, the systems and techniques may be used to generate, modify, or verify a dental treatment plan. In this way, the disclosed systems and techniques may improve tailoring of forces from dental appliances to treat malocclusion in reduced time or with fewer iterations compared to dental appliances designed without measuring forces applied to the teeth. For example, the system may be used to determine the shape and placement of various features of one or more dental appliances in a treatment plan to more accurately and/or predictably achieve selected tooth movements in a reduced period of time compared to dental appliances generated without measuring the force on a model dental arch. Additionally, the systems and techniques may be used to more quickly and efficiently validate new product performance compared to other new product testing techniques.

In examples in which the at least one translational force or rotational force are applied by neighboring teeth, systems and techniques may be used to predict undesired orthodontic movements of teeth and/or tooth wear that degrade a patient's dentition over time and/or predict relapse of orthodontic cases post-treatment. For example, the describe systems and techniques may be used for measuring forces in the space of a mechanical articulator, such as articulators used by some dental laboratories and/or professionals to model a patient's occlusion and/or measure the patient's condylar joints to determine occlusion dynamics through mandibular motions. In some examples, the described force sensors may be used with one or both arches of an articulator model to measure forces resulting from occlusal contacts between model teeth. Based on the directions and magnitudes of the forces, the systems and technique may be used to determine that forces are due to contacts between opposing teeth or indirectly between teeth in the same arch as a result of undesired movements of the teeth.

In some examples, prediction of undesired movements or relapse may be used to develop and/or calibrate virtual models. For example, existing 3D virtual modeling software may be used to simulate the occlusion in the form of a virtual articulation and therein predict contact points as well as directions and magnitudes of resultant force vectors. The described systems and technique may be used to determine forces resulting from the predicted contact points. The determined force may be compared to the predicted (modeled) force to determine the accuracy of the 3D virtual modeling simulation, the system (i.e., physical test apparatus), or both. The simulation, the system, or both may be calibrated by reconfiguring either or both to comport with the other. Once calibrated, the 3D virtual modeling software may be used to verify virtual test results without the need for physical testing on every case. In some examples, the 3D virtual modeling software may be used for verification during iterative design, and the described systems may be used for final design validation.

In some examples, force vectors (including directions and magnitudes), measured by the force sensors connected to the model teeth, may be used in conjunction with virtual articulation or physical articulation measurement data to determine forces on the temporomandibular joints (TMJ). This data can be useful in diagnosing TMJ disorders. Consider also what claims we might add to support these additional uses.

FIG. 1 is a conceptual diagram illustrating an example force sensor system 10. Force sensor system 10 is configured to measure forces applied by a dental appliance 16 to a model dental arch 12. Force sensor system 10 includes a model dental arch 12 having a plurality of model teeth 14A-14N (collectively, "model teeth 14"), dental appliance 16, a plurality of force sensors 18A-18N (collectively, "force sensors 18"), and base 20. Force sensor system 10 may include additional components that, for clarity, are not shown in FIG. 1. For example, force sensor system 10 may include a power supply to provide power to the components of force sensor system 10. Similarly, the components of force sensor system 10 shown in FIG. 1 may not be necessary in every example of force sensor system 10.

Model teeth 14 include a plurality of model tooth crowns that are configured to represent at least a portion of a dental arch of a patient. In some examples, model teeth 14 may include model tooth roots, portions of tooth roots, or representations of other dental anatomy. Although illustrated as including fourteen teeth, in other examples, model teeth 14 may include fewer teeth, e.g., such as one to thirteen teeth that represent a portion of the dental arch of the patient, or more teeth, e.g., representing a dental arch of a patient having more than fourteen teeth.

Model teeth 14 may include any suitable material. In some examples, model teeth 14 may include a polymer, a ceramic, or a metal. Each tooth of model teeth 14 may be individually formed or formed together and subsequently separated. In some examples, model teeth 14 may be 3D printed, molded, cast, or milled.

Figure 2:
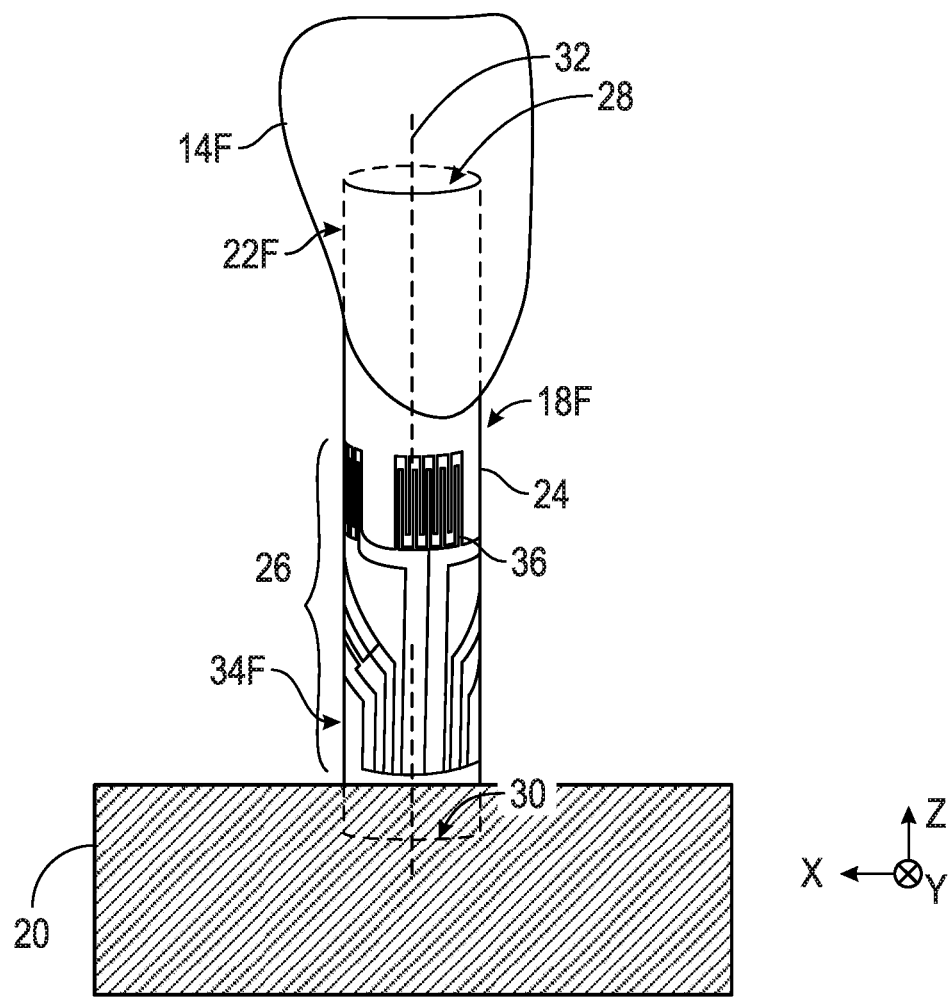
FIG. 2 is a conceptual diagram illustrating an example force sensor of the force sensor system illustrated in FIG. 1.

Each respective tooth of model teeth 14 may define a respective cavity configured to receive a respective force sensor of force sensors 18. FIG. 2 is a conceptual diagram illustrating an example force sensor 18F of force sensor system 10. For example, as illustrated in FIG. 2, model tooth 14F may define a recess 22F configured to receive a portion of force sensor 18F. In some examples, a respective cavity may extend along a long axis of the respective tooth. The long axis of the respective tooth may include an axis that extends through the crown and the root of the actual tooth of the patient, around which the substance of the tooth is most symmetrically distributed. A method for determining a long axis of a tooth is described in U.S. Pat. No. 7,033,327, "METHOD OF DETERMINING THE LONG AXIS OF AN OBJECT", by Richard E. Raby, which is incorporated by reference herein in its entirety. In this way, a respective force sensor extending from the respective cavity may represent the root of the actual tooth of the patient.

Dental appliance 16 is configured to receive, e.g., to be fitted on, model teeth 14. As illustrated in FIG. 1, dental appliance 16 includes an aligner tray, such as a clear tray aligner. In other examples, dental appliance 16 may include one or more of braces (e.g., brackets coupled to an archwire), retainers, palatal expanders, separators, other orthodontic appliances, or combinations thereof.

Each force sensor of force sensors 18 includes a post 24 and strain gauge region 26 that includes at least one strain gauge. Post 24 extends from a first end 28 to a second end 30 along a central longitudinal axis 32. Post 24 may define any suitable shape, such as a cylinder, polygonal prism, irregular prismatic shape, or combinations thereof. In some examples, each post 24 of force sensors 18, or a subset of force sensors 18, may be substantially identical in shape and construction (e.g., identical or nearly identical within common manufacturing tolerances). Forming substantially identical force sensors 18 may reduce manufacturing costs and facilitate calibration of force sensors 18. In some examples, each post 24 of force sensors 18 may be unique. For example, respective each post 24 may be designed to represent a selected dimensions and/or shapes to more accurately represent a respective root of the actual tooth represented by each respective tooth of teeth 14.

In some examples, the shape of post 24, such as within strain gauge region 26 or between strain gauge region and first end 28 and/or second end 30, may vary along its central longitudinal axis. For example, at least a portion of post 24 may define one or more necks, tapered sections, or transitions, such as transitions from a cylindrical shape to a polygonal prism or from a first polygonal prism to a second polygonal prism. Such a variation in the shape of post 24 may be configured to concentrate deflection of post 24 in response to a force applied at or near first end 28, e.g., a force applied to tooth 14F. For example, in examples in which post 24 includes a neck, deflection of post 24 in response to a force applied to tooth 14F may be concentrated at or near the neck. In some examples, a neck may include a region that tapers from a larger first cross sectional dimension to a minimal cross sectional dimension for a selected length, such as a cross section between about 1 mm and about 5 mm for a length of between about 5 mm to about 20 mm, and then expands to a larger second cross sectional dimension (which may be the same or different than the first cross sectional dimension). In some examples, the cross-section may be uniform along the length of the post. In other examples, the cross-section may be circular, oval, elliptical, teardrop, or polygonal in shape. For example, the cross-section may be configured to provide a first deflection characteristic about a first axis, and a second deflection characteristic about a second axis. The first and second deflection characteristics may be selected to approximate the deflection characteristics of a tooth crown, which may differ depending on the direction of an applied force. The deflection characteristics of a tooth crown may be due to an asymmetric nature of the tooth root as it connects to surrounding alveolar bone via the periodontal ligament and/or anchorage of the tooth by more than one root.

Figure 3B:
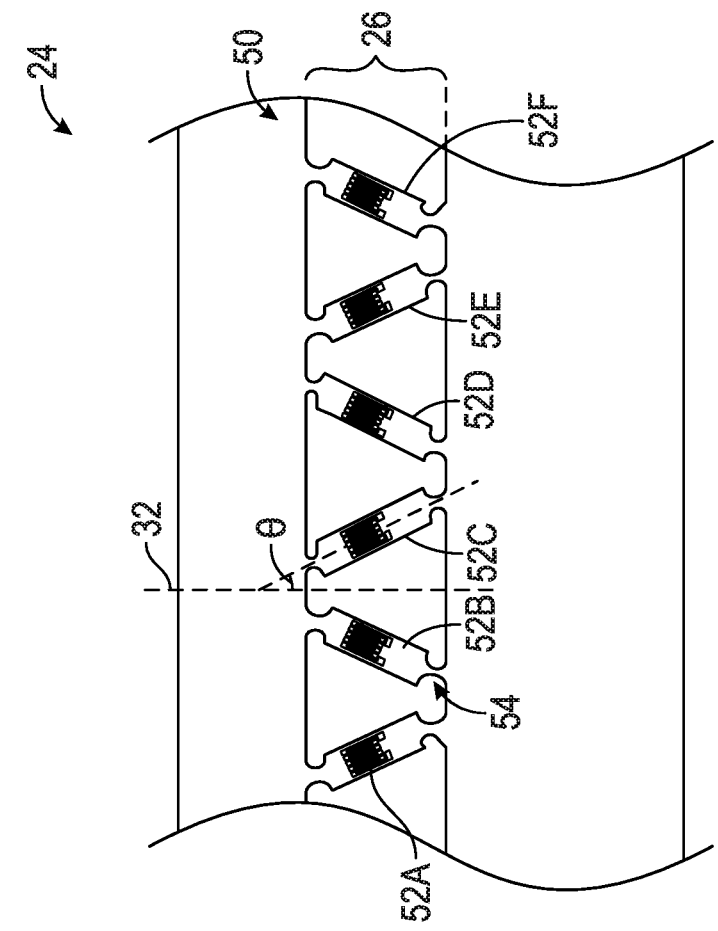
FIG. 3B is a conceptual diagram illustrating an example pattern of the hexapod illustrated in FIG. 3A, illustrated in a two-dimensional "unrolled" form.
Figure 3A:
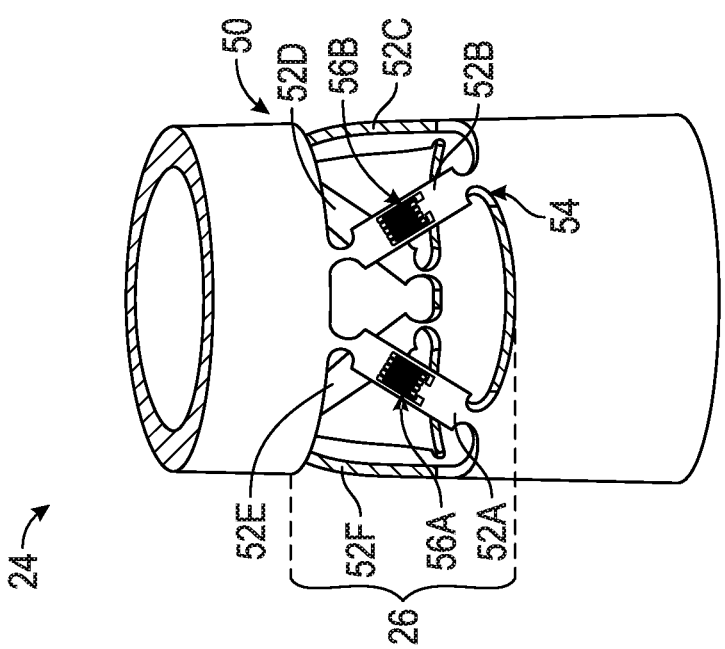
FIG. 3A is a conceptual diagram illustrating an example configuration of a strain gauge region of an example force sensor that includes a hexapod.

In some examples, at least a portion of post 24 may define a hexapod or other structure configured to concentrate deflection of post 24 to selected regions of post 24. FIG. 3A is a conceptual diagram illustrating an example configuration of strain gauge region 26 that includes hexapod 50. FIG. 3B is a conceptual diagram illustrating an example pattern of hexapod 50 illustrated in FIG. 3A, illustrated in two-dimensional "unrolled" form. Hexapod 50 includes six trusses 52A-52F (collectively, "trusses 52"). In some examples, post 24 may include additional or fewer trusses 52. Trusses 52 may be formed by selectively removing material from post 24 to define triangular cavities and trusses 52. In some examples, an angle θ of trusses 52 relative to central longitudinal axis 32 of post 24 is between about 30-degrees and about 60 degrees, such as about 45-degrees. By removing this material, force resulting from deflection of post 24 may be concentrated in a reduced cross-sectional area of trusses 52 (e.g., relative to a total cross sectional area of post 24) and align lines of force with a respective longitudinal axes of each respective truss of trusses 52, which may increase the magnitude of the strain and, consequently, increase the signal to noise ratio of respective strain gauges of each respective truss of trusses 52.

In some examples, shear may be further reduced with shear reduction regions, e.g., shear reduction region 54, defined as a semicircular or similar cutout where a respective truss is attached to post 24. In these ways, trusses 52 reduce shear deformation in strain gauge region 26 compared to posts without trusses 52. By reducing shear deformation, hexapod 50 is configured to concentrate deflection of post 24 as tension or compression in each truss of trusses 52, rather than shear. For example, in response to a translational force and/or a rotational force applied to post 24, each truss of trusses 25 may be subjected to substantially pure tension or pure compression (e.g., tension and/or compression may be greater than shear). In this way, respective strain gauges 56A-56F may be positioned and oriented on each respective truss of trusses 52 to measure tension or compression of each of truss 52. In particular, the longitudinal axis of each respective strain gauge 56A-56F may be aligned with the longitudinal axis of each respective truss 52A-52F, which may be a diagonal axis along which tension or compression forces are concentrated. In some examples, tension or compression of each truss 52 may be analyzed, e.g., by using inverse kinematics, to determine the translational force and/or the rotational force applied to post 24. In some scenarios, all or portions of post 24 (e.g., trusses 52) may be formed via additive manufacturing (e.g., 3D printing) and may provide similar benefits as described above.

In some examples, post 24 may define additional features, such as, for example, one or more keyseats, recesses, or the like. In some examples, additional features of post 24 may be configured to couple post 24 to tooth 14F or base 20, or concentrate deflection in a selected portion of post 24.

In some examples, a length of post 24 may approximate a length of the root of the actual tooth represented by a respective tooth (e.g., tooth 14F) of model teeth 14. For example, a length of post 24 may be within a range from about 10 millimeters (mm) to about 30 mm. A cross sectional dimension, e.g., diameter or width, of post 24 may be less than a maximum width of the actual tooth represented by a respective tooth (e.g., tooth 14F) of model teeth 14. For example, a cross sectional dimension of post 24 may be within a range from about 1 mm to about 10 mm, such as between about 1 mm and about 5 mm. In some examples, a cross section dimension of post 24 may be selected such that each of force sensors 18 may be positioned within or nearly within (e.g., greater than 50%) a projection or shadow of the dental arch represented by model teeth 14. For example, each post 24 of force sensors 18 may be substantially parallel to one another and extend substantially perpendicular (e.g., in the z-direction) to a plane (e.g., the x-y plane) defined by the dental arch represented by model teeth 14 and/or by base 20. Using relatively smaller force sensors may enable measuring forces on more teeth of a model dental arch and/or model teeth representing more severe malocclusions compared to other force measurement devices, such as those that include relatively larger 6-DOF force sensors in the form of load cells that may be attached to mounting arms cantilevered out from the dental arch.

In some examples, post 24 of force sensor 18F may extend along a respective central longitudinal axis 32 that is substantially parallel to a long axis of the actual tooth represented by tooth 14F. For example, as discussed above, model tooth 14F may define a recess 22F configured to receive first end 28 of force sensor 18F such that post 24 extends substantially along a long axis of the actual tooth represented by tooth 14F.

First end 28 is configured to couple to tooth 14F and second end 30 is configured to couple to base 20. For example, first end 28 may form a friction fit with recess 22F of tooth 14F or may be bonded with an adhesive to tooth 14F. Similarly, second end 30 may form a friction fit with a recess 34F of base 20 or may be bonded with an adhesive to base 20. In some examples, first end 28 and/or second end 30 may define a substantially inflexible peg, e.g., one or more orders of magnitude less flexible than strain gauge region 26. In some examples, first end 28 and/or second end 30 may be configured to couple to a tube, sleeve, or cup, which is coupled to recess 22F of tooth 14F or recess 34F of base 20, respectively. The tube, sleeve, or cup may include a relatively more rigid material or a relatively elastic material, e.g., compared to post 24, tooth 14F, and/or base 20. The material and dimensions of the tube, sleeve, or cup may be selected to enable greater deflection of post 24 than without the tube, sleeve, or cup. The greater deflection, may, in some examples, better represent the deflection expected of an actual tooth in the socket of alveolar bone as the periodontal ligament is compressed, stretched, or sheared. Although strain gauge region 26 may not be configured to directly measure the deformation of the tube, sleeve, or cup, force sensor 18F may, in some examples, be calibrated to associate deflection of post 24 with the overall deflection of the assembly that includes post 24 and the tube, sleeve, or cup.

In some examples, first end 28 and/or second end 30 may be configured to orient post 24 (e.g., in the x-y plane) relative to tooth 14F and/or base 20. For example, first end 28 and/or second end 30 may define an asymmetric shape corresponding to an asymmetric shape of recess 22F of tooth 14F and/or recess 34F of base 20, respectively. In some examples, first end 28 and/or second end 30 may be configured to limit rotation of tooth 14F about axis 32 relative to post 24 and/or limit rotation of post 24 about axis 32 relative to base 20, respectively. For example, first end 28 and/or second end 30 may define a polygonal prism and respective recess 22F and/or recess 34F may define a corresponding polygonal prism. In some examples, first end 28 and/or second end 30 may define a keyseat and respective recess 22F and/or recess 34F may define a corresponding keyway. The keyseat and keyway, together with a key, may define a keyed joint that limits rotation about axis 32.

Post 24 may include any suitable material. In some examples, post 24 includes a nonconductive material, such as a polymer, an acrylic, a ceramic, a glass, or a combination thereof. In some examples, post 24 may include a metal or a semiconductor material. The metal or semiconductor material may be coated with an electrically insulating material (e.g., an "insulator"). For example, the insulator may be disposed between post 24 and strain gauge region 26. As one example, post 24 may be formed from stainless steel and coated with a first insulator, such as, for example, parylene. Subsequently, strain gauge region 26 may be formed on the first layer, e.g., by electroplating with a conductive material such as copper. As discussed in further detail below, the copper layer may be etched or ablated to form the pattern of strain gauge region 26. In some examples, the strain gauge region 26 may be subsequently coated with a second insulator, such as, for example, parylene, to protect strain gauge region 26 from corrosive materials, such as acidic fingerprints, short-circuiting by virtue of contact with other conductors, or the like. In this way, materials of post 24 may be selected that, in combination with selected other dimensions, such as diameter and/or length, permit tuning of post 24 to a prescribed amount of deflection under stress that is substantially similar to the deflection of a tooth in a patient's mouth when the same force is applied by the dental appliance or a tooth in the mouth of the patient. As used herein, the term substantially similar deflection may include an amount of deflection that is of the same magnitude, such as a difference of less than about 50%, such as less than about 10%, or less than about 5%.

In some examples, the materials of post 24 may be selected to have a desired rigidity or deflection in response to a force applied to post 24 via tooth 14F. For example, a less rigid post 24 may provide a larger signal to noise ratio of the strain gauges in strain gauge region 26 compared to a more rigid post 24. A more rigid post 24 may reduce an effect of deflection of post 24 on force transmission through post 24 compared to a less rigid post 24. In some examples, the system can be configured such that the deflection of post 24 in response to a given force may be similar to the displacement of the actual respective tooth due to deformation of the periodontal ligament and, to a much smaller degree, the deformation of the tooth and the alveolar bone surrounding the root. In this way, post 24 may more accurately represent the displacement, e.g., in response to the applied force, that would occur on the actual tooth of the patient, particularly the crown of the tooth. More specifically, the dimensions and material properties, such as diameter, length, and modulus of elasticity, of the post may be configured to achieve an amount of deflection similar to the displacement of the actual respective tooth.

In some examples, post 24 may include a metal or a combination of metallic and nonmetallic subcomponents. For example, a first portion of post 24 including first end 28 and/or second end 30 may include a metal or relatively more rigid material and a second portion of post 24 between the relatively more rigid portions of post 24 (e.g., strain gauge region 26) may include a polymer or a relatively less rigid material. In this way, the first portion of post 24 including first end 28 and/or second end 30 may be configured to have substantially zero deflection relative to the second portion of post 24 between the relatively more rigid portions of post 24 in response to a force applied to tooth 14F by dental appliance 16.

Strain gauge region 26 may be formed on or in a surface 36 of post 24 between first end 28 and second end 30. Strain gauge region 26 may include any suitable type of strain gauge. In some examples, strain gauge region 26 includes an electrically resistive strain gauge that defines an elongate electrically conductive element defining a serpentine path having a long axis and a narrow axis. An electrical conductance of the electrically resistive strain gauge is dependent on a geometry of the strain gauge. When the electrically resistive strain gauge is stretched along the long axis, e.g., within the limits of an elasticity of the electrically resistive strain gauge such that it does not break or permanently deform, the electrically resistive strain gauge will become narrower and longer, which increases an electrical resistance of the electrically resistive strain gauge. Conversely, compression of the electrically resistive strain gauge, e.g., such that the electrically resistive strain gauge does not buckle, will broaden and shorten the electrically resistive strain gauge, which decreases an electrical resistance of the electrically resistive strain gauge. In this way, the amount of compression or tension of the electrically resistive strain gauge may be determined based on a measured electrical resistance of the electrically resistive strain gauge.

An electrically resistive strain gauge may be integrally formed on or in surface 36. For example, in examples in which post 24 includes a nonconductive material, post 24 may be plated in a conductive material that is subsequently etched or laser cut to define the electrically resistive strain gauge region 26 in the conductive material on surface 36. In some examples, plating may include electroless plating and subsequent electroplating. In some examples, laser cutting may include mounting the plated post 24 in a rotary stage of a multi-axis femtosecond laser cutter (e.g., a rotary axis, a first linear axis along the rotary axis of rotation, and a second linear axis perpendicular to the first linear axis), and selectively ablating the plated metal in a pattern that defines conductive electrical traces analogous to an electrically resistive strain gauge.

In some examples, strain gauge region 26 includes an optical strain gauge. An optical strain gauge region 26 may include an light guide extending along a long axis and having a Bragg grating and integrally formed on or in surface 36. For example, post 24 may include a core material coated in a transparent material, or other material suitable to transmit light, the transparent material coated or plated in a material in which a Bragg grating may be formed, e.g., via laser etching. In some examples, post 24 that includes strain gauge region 26 having an optical strain gauge may include a polymeric core material, such as acrylic, the core material coated with a reflective metal, such as nickel, the reflective metal coated in a polymer configured to transmit a selected wavelength of radiation, such has parylene, and the light transmissive material optionally coated in another reflective material layer or material having a refractive index less than a refractive index of the light transmissive material. In some examples, as the light guide having a Bragg grating undergoes compression or tension, the grading changes. When light is transmitted through the light guide, a change in the grading may result in a change in at least one of an amount of reflected light or a wavelength range of reflected light. The amount or wavelength range of the reflected light may be converted into a signal, e.g., by an optical transducer, that may be used to determine tension or compression of the light guide. In this way, light guides including a Bragg grating may be used to determine a translational force and/or a rotational force applied to post 24.

In some examples, strain gauge region 26 may include additional or alternative strain gauges, such as semiconductor strain gauges or piezoresistors.

Figure 4B:
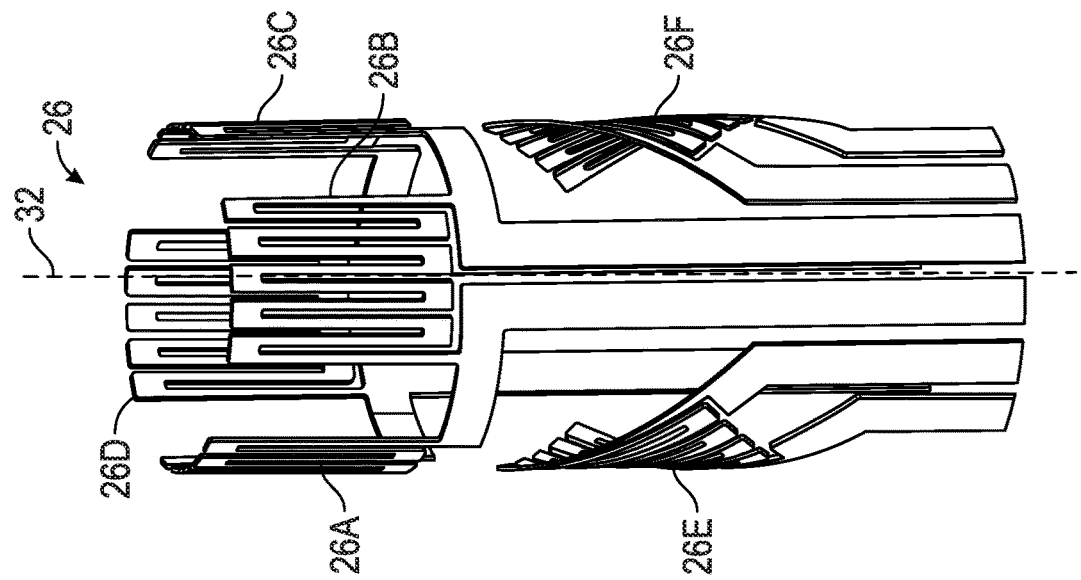
FIGS. 4A and 4B illustrate a plurality of strain gauges in the strain gauge region of the post of the example force sensor illustrated in FIG. 1.
Figure 4A:
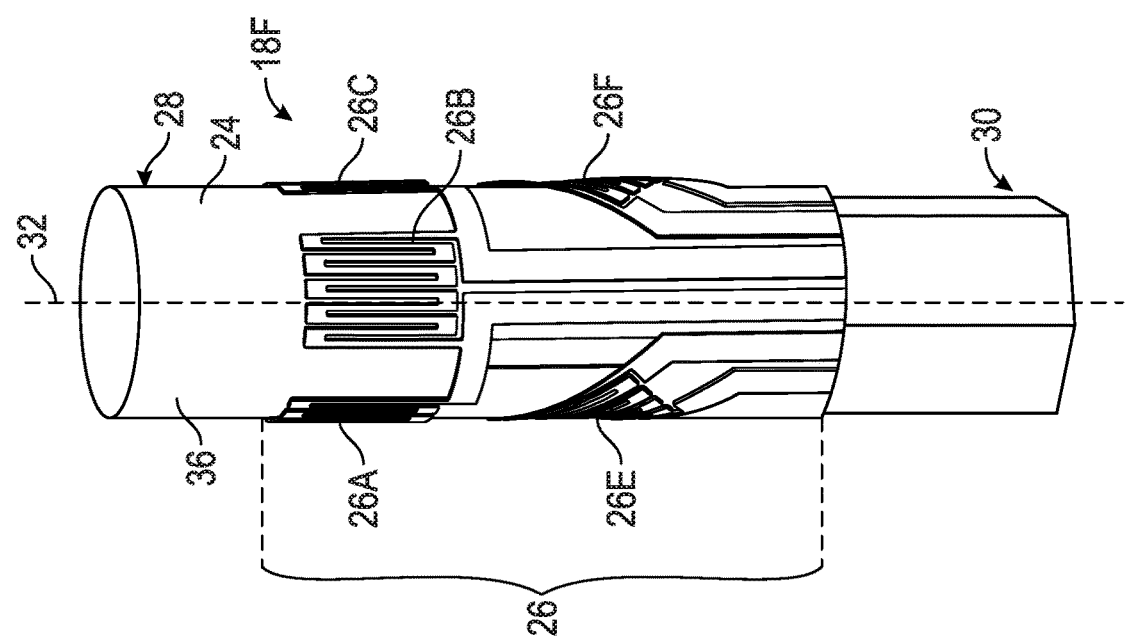

FIGS. 4A and 4B illustrate post 24 including strain gauge region 26 that includes a plurality of strain gauges 26A-26F each having a position and orientation that enable measurement of the deflection of post 24 in three-dimensions. In some examples, each of strain gauges 26A-26F may be selectively oriented on post 24 to measure, e.g., by simultaneous analysis of each resistance measurement from strain gauges 26A-26F, the deflection of post 24 in six degrees of freedom (6-DOF). For example, strain gauge region 26 includes a first strain gauge 26A, a second strain gauge 26B, a third strain gauge 26C, and a fourth strain gauge 26D (e.g., vertically oriented strain gauges), each having a long axis extending in the axial direction parallel to central longitudinal axis 32 of post 24. Each of vertically oriented strain gauges 26A-26D is disposed about 90-degrees apart about central longitudinal axis 32 of post 24. In this way, vertically oriented strain gauges 26A-26D are configured to measure angular deflection away from central longitudinal axis 32. For example, strain gauges 26A-26D may be configured to measure a translational force applied to tooth 14F, such as in one or more of the lingual, labial, mesial, or distal directions. In some examples, the vertically oriented strain gauges may include fewer than four strain gauges, such as three strain gauges disposed about 120-degrees apart about central longitudinal axis 32, or more than four strain gauges, such as five or more strain gauges disposed about 72-degrees apart about central longitudinal axis 32. Although illustrated at substantially the same position relative to the z-axis, in other examples, vertically oriented strain gauges 26A-26D may be disposed along different positions relative to the z-axis.

In some examples, strain gauge region 26 also includes a fifth strain gauge 26E and a sixth strain gauge 26F having a long axis oriented diagonally at opposing angles relative to central longitudinal axis 32 (e.g., diagonally oriented strain gauges 26E and 26F). The angle of diagonally oriented strain gauges 26E and 26F may be between about 30-degrees and 60-degrees relative to central longitudinal axis 32. In this way, diagonally oriented strain gauges 26E and 26F are configured to measure rotation of post 24 about central longitudinal axis 32. For example, strain gauges 26E and 26F may be configured to measure a rotational force applied to tooth 14F, such as in a clockwise or counter-clockwise direction. In some examples, the diagonally oriented strain gauges may include fewer than two strain gauges. For example, the diagonal strain gauges may include one diagonally oriented strain gauge configured to measure a rotation in a first direction via compression of the strain gauge or rotation in a second direction opposing the first direction via tension of the strain gauge. The diagonally oriented strain gauges may include more than two strain gauges, such as three or more diagonally disposed at different positions along the z-axis and/or oriented at different angles relative to central longitudinal axis 32. Together, vertically oriented strain gauges 26A-26D and diagonally oriented strain gauges 26E and 26F may allow measurement of cantilever bending (e.g., tooth tipping) and axial torsion (e.g., first order tooth rotation).

To measure pure translation or tooth torqueing, strain gauge region 26 may include a plurality of strain gauge arrays disposed at different positions along the z-axis relative to central longitudinal axis 32. For example, strain gauge region 26 may include a first strain gauge array that includes one or more strain gauges (e.g., the same or similar to strain gauges 26A-26F discussed above) disposed at a first axial position relative to central longitudinal axis 32 and a second strain gauge array that includes one or more strain gauges (e.g., the same or similar to strain gauges 26A-26F discussed above) disposed at a second axial position relative to the central longitudinal axis 32. The first axial position is disposed a distance from the second axial position. For example, the distance may be between about 2 mm to about 20 mm. In some examples, the first strain gauge array and the second strain gauge array may at least partially overlap an axial region of post 24. The plurality of strain gauge arrays may be configured to measure complex deflection of post 24, such as, for example, pure translation, torqueing, or other forces that may result in compound bends in post 24, the compound bends having a plurality of deflections at different positions along the z-axis, each of the plurality of deflections having translational and/or rotational components.

FIG. 4C is a conceptual diagram illustrating an example sensor pattern of strain gauges 26A-26F, illustrated in two-dimensional "unrolled" form. Each of strain gauges 26A-26F may be incorporated into one or more sensor patterns, such as sensor pattern 36. Sensor pattern 36 is configured to carry a signal, such as an electrical resistance of the strain gauges, toward second end 30 of post 24 (e.g., illustrated by the dashed line in FIG. 4C). Sensor pattern 36 of the strain gauges 26A-26F terminate in contact pads 38A-38H (collectively, "contact pads 38"). Contact pads 38 are configured to transmit the signal from strain gauges 26A-26F. In some examples, contact pads 38 may include enlarged soldering pads or other electrically conductive elements. Contact pads 38 are configured to couple strain gauges 26A-26F to a computing device (e.g., computing device 132 describe below in reference to FIG. 6) or other electronic module that enables analog signal measurement and/or analog-to-digital conversion. For example, contact pads 38 may be configured to electrically couple to lead wires, such as enamel-coated wires or flexible ribbon cable having electrical contacts that align and/or mate with contact pads 38.

In some examples, strain gauge region 26 may include a protective coating to protect against corrosion, abrasion, conductive finger oils, salts, or dirt. For example, strain gauge region 26 may be coated with a nonconductive protective coating, such as parylene, polyethylene, polypropylene, polyvinyl chloride, polyolefin, or other polymers. In some examples, a parylene coating may provide electrical insulation and have a substantially constant coating thickness. A substantially constant coating thickness may include a constant or near constant coating thickness within common coating application tolerances, such as less than about a 10% variation in coating thickness, such as less than about a 5% variation in coating thickness. In some examples, to achieve a substantially constant thickness, a parylene coating may be applied to at least strain gauge region using vapor deposition. In some examples, a substantially constant coating thickness may better maintain consistency in mechanical properties between different posts compared to coatings that do not have a substantially constant thickness.

Figure 5A:
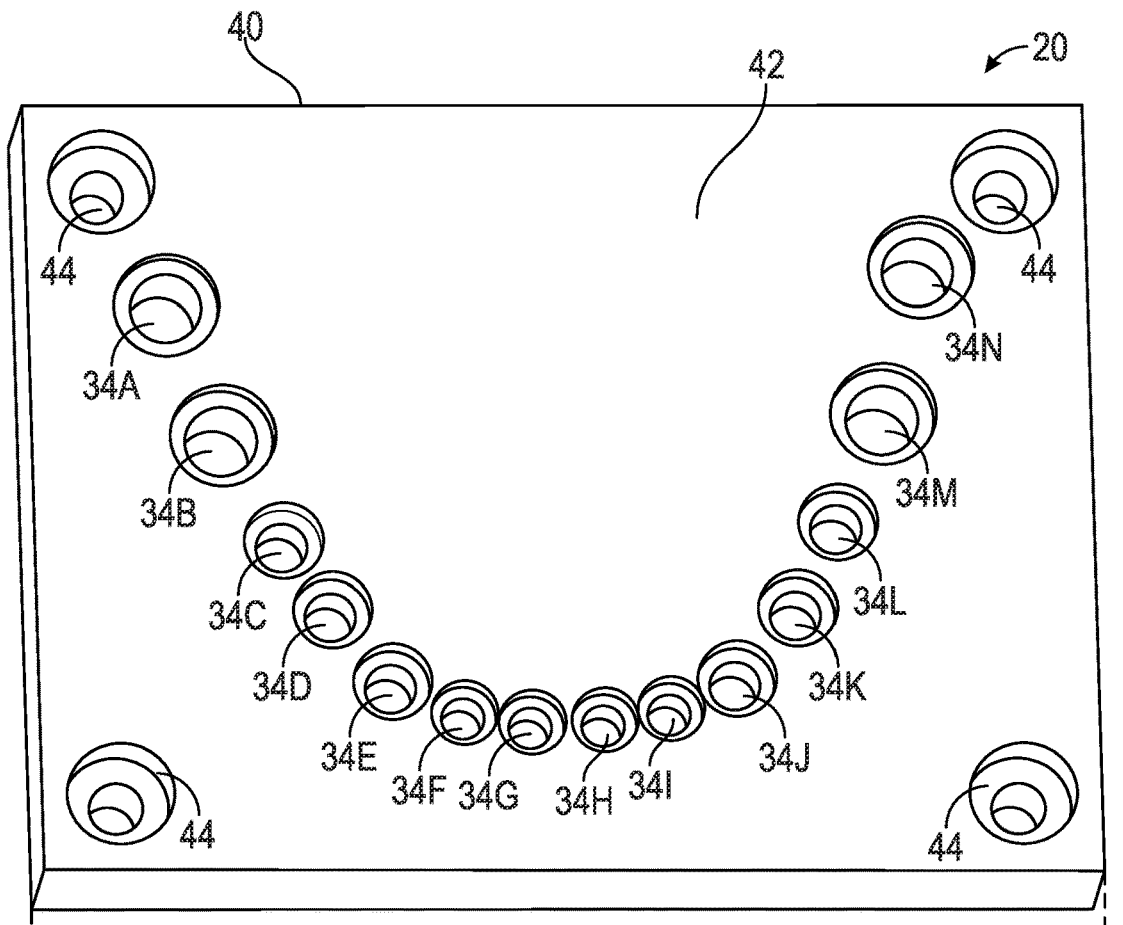
FIGS. 5A and 5B are conceptual diagrams illustrating an elevated view and projected sideview of the base of the example force sensor system illustrated in FIG. 1.
Figure 5B:
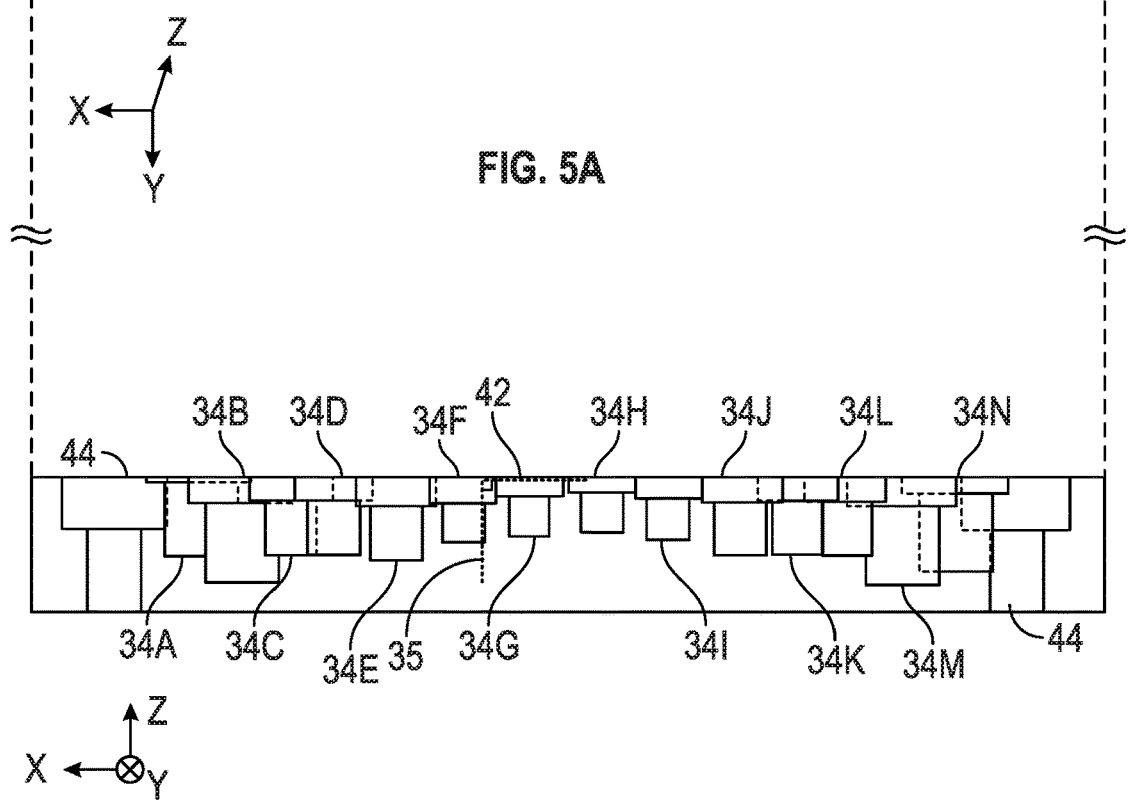

FIGS. 5A and 5B are conceptual diagrams illustrating an elevated view and projected sideview of base 20. Base 20 includes a substrate 40 defining a surface 42 and having a plurality of recesses 34FA-34FN (collectively, "recesses 34") formed therein. Each recess of recesses 34 is configured to receive a respective force sensor of force sensors 18. For example, recess 34F is configured to receive second end 30 of post 24 of force sensor 18F. In some examples, recesses 34 may include a counterbore configured to provide clearance around, for example, contact pads 38 of post 24.

As illustrated in FIG. 5B, each recess of recesses 34 may include a selected depth. The depth of each respective recess of recesses 34 may be selected to position each respective tooth of teeth 14 to represent the dental arch, or a portion of the dental arch, of a patient. For example, force sensors 18, or a subset thereof, may have a standard length between about 10 mm and about 30 mm. To align each tooth of teeth 14 to represent the dental arch of the patient, each force sensor of force sensors 18 may be recessed a different selected distance in base 20.

In some examples, recesses 34 may extend into substrate 40 at an angle that is substantially perpendicular to surface 42. Substantially perpendicular may include a perpendicular or nearly perpendicular angle within manufacturing tolerances, such as milling or boring techniques. As illustrated in FIG. 5B, a central axis 35F of recess 34F is substantially perpendicular to surface 42. Although illustrated as substantially perpendicular to surface 42 of substrate 40, in some examples, one or more of recesses 34 may be oriented at an angle relative to surface 42. For example, recesses 34 may extend into substrate 40 at an angle between about 45-degrees to about 90-degrees relative to surface 42. In some examples, the angle of a respective recess of recesses 34 relative to surface 42 may be selected to represent an angle of a long axis of an actual tooth represented by a respective tooth of teeth 14. In this way, an orientation of force sensors 18 may be selected to better represent the dental anatomy of a patient compared to force sensors that are not oriented to represent the long axis of an actual tooth.

In some examples, base 20 may be configured to couple to a suspension system (not shown). The suspension system may include one or more struts configured to mechanically couple to cavities 44 and an optional platform. The platform may include, for example, a countertop, a granite slab, or other rigid surface. The struts may be configured to dampen ambient vibrations. For example, the struts may include a vibration dampening component that includes a polymer, foam, rubber, or other material configured to reduce transmission of vibrations through the struts. In other examples, the platform may be positioned on a vibration dampening pad that includes a polymer, foam, rubber, or other material configured to reduce transmission of vibrations through the platform.

Figure 6:
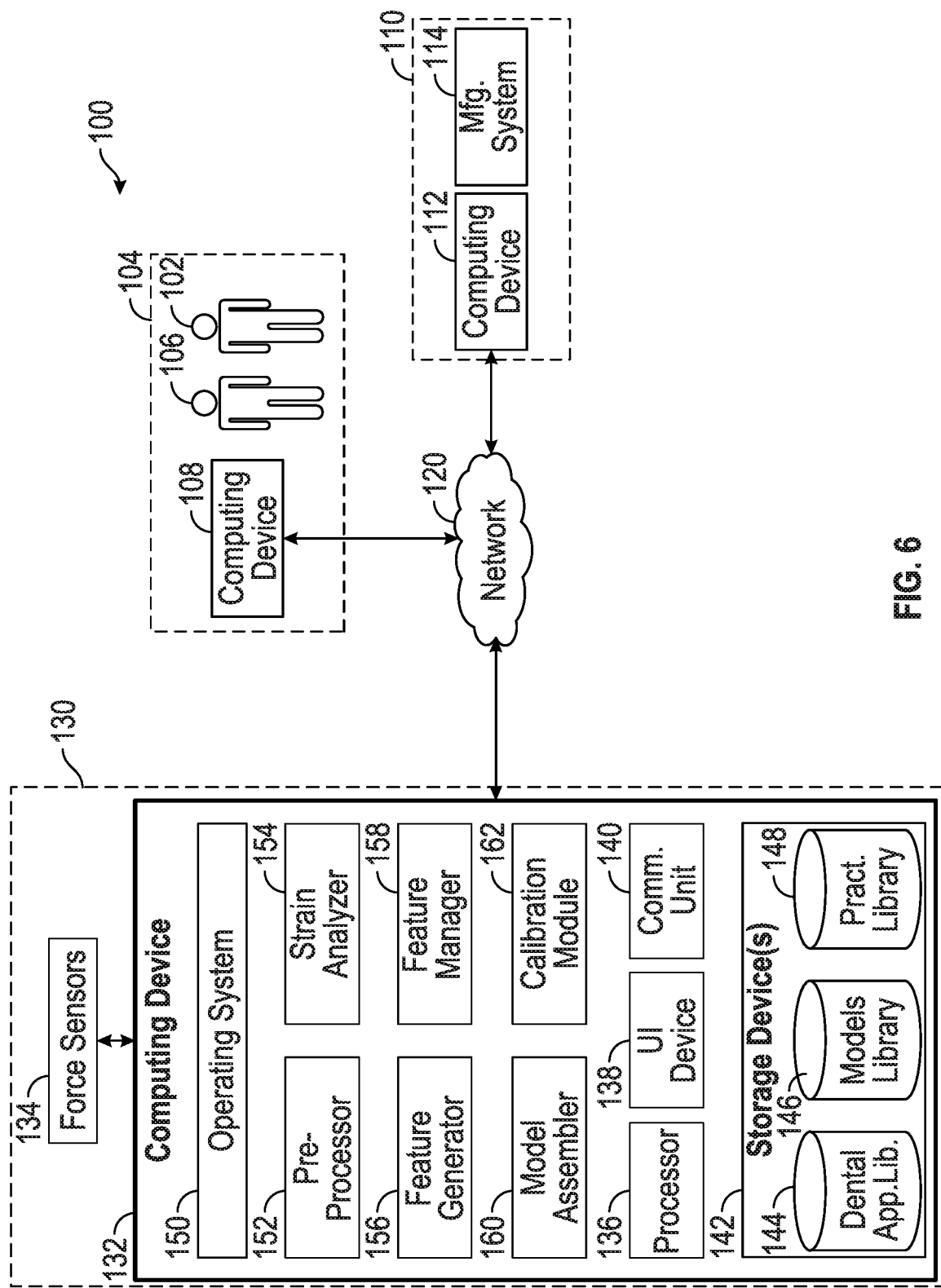
FIG. 6 is a conceptual diagram illustrating an example computer environment for determining at least one of a translational force or a rotational force applied of a dental appliance to the respective tooth of the plurality of model teeth.

A force sensor system, such as force sensor system 10, may be used to develop and/or improve a virtual treatment plan of a dental appliance. FIG. 6 is a conceptual diagram illustrating an example computer environment 100 for determining at least one of a translational force or a rotational force applied of a dental appliance to the respective tooth of the plurality of model teeth to develop and/or improve a virtual treatment plan that uses the dental appliance. Dental appliance computer environment 100 includes clinic 104, manufacturing facility 110, and force measurement system 130.

Force measurement system 130 includes computing device 132 and force sensor system 134. Force measurement system 130 is configured to determine, e.g., by computing device 132, at least one of a translational force or a rotational force, e.g., via force sensor system 134, applied by a dental appliance to a plurality of model teeth representing a dental arch of patient 102. Force sensor system 134 may be the same as or substantially similar to force sensor system 10 described above in reference to FIGS. 1-4C. In some examples, computing device 132 may automatically or semi-automatically generate, based on the determined forces, a digital model of a dental appliance for treating malocclusion of the dental anatomy of patient 102.

Computing device 132 includes processor 136, one or more user interface (UI) devices 138, one or more communication units 140, and one or more storage devices 142. User interface devices 138 may be configured to receive user input and/or output information, also referred to as data, to a user of computing device 132. One or more input components of user interface devices 138 may receive input. Examples of input are tactile, audio, kinetic, and optical input, to name only a few. For example, user interface devices 138 may include a mouse, keyboard, voice responsive system, video camera, buttons, control pad, microphone, or any other type of device for detecting input from a human or machine. In some examples, user interface devices 138 may be a presence-sensitive input component, which may include a presence-sensitive screen, touch-sensitive screen, or the like.

One or more output components of user interface devices 138 may generate output. Examples of output are data, tactile, audio, and video output. Output components of user interface devices 138, in some examples, include a display device (e.g., a presence-sensitive screen, a touch-screen, a liquid crystal display (LCD) display, a Light-Emitting Diode (LED) display, an optical head-mounted display (HMD), among others), an LED, a speaker, or any other type of device for generating output understandable by a human or machine.

Processor 136 represents one or more processors such as a general-purpose microprocessor, a specially designed processor, an application specific integrated circuit (ASIC), a field programmable gate array (FPGA), a collection of discrete logic, or any type of processing device capable of executing the techniques described herein. In one example, storage devices 142 may store program instructions (e.g., software instructions or modules) that are executed by processor 136 to carry out the techniques described herein. In other examples, the techniques may be executed by specifically programmed circuitry of processor 136. In these or other ways, processor 136 may be configured to execute the techniques described herein.

One or more storage devices 142 may store data for processing by processor 136. In some examples, storage devices 142 is a temporary memory, meaning that a primary purpose of storage devices 142 is not long-term storage. Storage devices 142 may be configured for short-term storage of data as volatile memory and therefore not retain stored contents if deactivated. Examples of volatile memories include random access memories (RAM), dynamic random access memories (DRAM), static random access memories (SRAM), and other forms of volatile memories known in the art.

Storage devices 142 may, in some examples, also include one or more computer-readable storage media. Storage devices 142 may be configured to store larger amounts of data than volatile memory. Storage devices 142 may further be configured for long-term storage of data as non-volatile memory space and retain data after activate/off cycles. Examples of non-volatile memories include, solid state drives (SSDs), hard disk drives (HDDs), flash memories, or forms of electrically programmable memories (EPROM) or electrically erasable and programmable (EEPROM) memories. Storage devices 142 may store program instructions and/or data associated with software components 152-162 and/or operating system 150.

Storage devices 142 may include one or more data library, such as, for example, dental appliance library 144, models library 146, and practitioner library 148. Libraries 144, 146, and 148 may include relational databases, multi-dimensional databases, maps, and hash tables, or any data structure that stores data. In one example, dental appliance library 144 may include data related to features of dental appliances. In one example, models library 146 includes digital dental data or models of forces that may be transmitted from a dental appliance to teeth. In one example, practitioner library 148 may include data related to practitioner preferences or historical treatment plans. In some instances, libraries 144, 146, and 148 may be stored locally at computing device 132 or may be accessed via a networked file share, cloud storage, or other remote datastore, for example, via network 120.

Computing device 132 may execute one or more of software components 152-162 with processor 136. For example, computing device 132 may determine, using one or more of components 152-162, based on signals received from force sensor system 134, at least one of a translational force or a rotational force applied by a dental appliance to model teeth. Additionally, in some examples, computing device 132 may automatically or semi-automatically generate, using one or more of components 152-162, based on the determined translational force and/or the determined rotational force, a virtual treatment plan for treating malocclusions of the dental anatomy of patient 102, such as a digital model of a dental appliance. Computing device 132 may execute any of components 152-162 as or within a virtual machine executing on underlying hardware. In one example, any of components 152-162 may be implemented as part of operating system 150.

Pre-processor 152 may pre-process analog signals and/or digital signals from force sensor system 134. Although illustrated as a component of computing device 132, in some examples, pre-processor 152 may be a component of force sensor system 134. Pre-processor 152 may include, for example, one or more operational amplifiers and/or one or more digital-to-analog converters. In one example, pre-processor 152 performs pre-processing to convert analog signals from one or more strain gauges into useable digital signals. In some examples, pre-processor 152 identifies a respective force sensor of force sensor system 134. In some examples, pre-processor 152 identifies a respective strain gauge of a plurality of strain gauges of a respective force sensor of force sensor system 134. In some examples, pre-processor 152 identifies a local coordinate system for each individual tooth of model teeth and/or a digital dental anatomy (e.g., current and/or future) to associate each individual tooth of model teeth with a respective tooth of the digital dental anatomy.

Strain analyzer 154 may determine a translational force and/or a rotational force on a respective force sensor of force sensor system 134. For example, the translational force and/or the rotational force on a respective force sensor of force sensor system 134 may be associated with signals output by a plurality of strain gauges of the respective force sensor. In some examples, strain analyzer 154 may use a representation of a function stored in models library 146, which relates the translational force and/or the rotational force to signals output by a plurality of strain gauges of the respective force sensor, to determine the translational force and/or the rotational force on the respective force sensor. In some examples, strain analyzer 154 may use a system of equations stored in models library 146 to determine the translational force and/or the rotational force on the respective force sensor. For example, the system of equations may be based on parameters of the respective force sensor, such as, for example, a location and an output signal of each strain gauge on the respective force sensor, dimensions and material properties of the post of the respective force sensor, and the like. In some examples, strain analyzer 154 may use one or more lookup tables as a representation of a function that relates the force to the signal stored in models library 146 to determine the translational force and/or the rotational force on the respective force sensor. For example, calibration lookup tables stored in models library 146 may enable strain analyzer 154 to associate, for a particular force sensor configuration, a particular combination of output signals associated with a particular translational force and/or rotational force. In some examples, as an alternative to storing explicit signal and force values in a lookup table, coefficients of a mathematical function that models the relationship between the signal and the force, such as a polynomial function, might be stored. In some examples, the type of function to which the coefficients of a mathematical function apply might be implicit in the representation (e.g., data modelling or programming), or additional information might be stored in models library 146 to indicate the type of mathematical function to which the coefficients apply. In yet other examples, the function relating the signal to the force may be represented as a set of parameters that define a neural network.

In some examples, responsive to determining the translational force and/or the rotational force on a respective tooth or teeth, feature generator 156 generates one or more features of a digital model of a dental appliance for restoring the dental anatomy of patient 102 based at least in part on the determined translational force and/or the determined rotational force. Generating appliance features may include one or more of modifying known features of a dental appliance, determining new features to add to a dental appliance, or determining existing features to remove from a dental appliance. In some examples, feature generator 156 may generate features by determining characteristics of a feature, such as a size, shape, position, and/or orientation of the feature. The size, shape, position, and/or orientation of the feature may affect the magnitude, direction, and length of expression of a force applied to the teeth when the dental appliance is used on the teeth of the patient. Examples of features include, but are not limited to, shells of a dental appliance, a spring member, a bendable flap, a jumper, a spring bellows, an interproximal reinforcement, a gingival ridge, or other features of orthodontic appliances.

Dental appliance library 144 includes the features that may be included in dental appliance 16. For example, dental appliance library 144 may include a digital model of dental appliance 16 that includes all features of dental appliance 16, modified variations of all features of dental appliance 16, and/or features that may be added to dental appliance 16.

Feature manager 158 determines the characteristics of one or more features that are included in dental appliance library 144. In one example, the determined characteristics of one or more features are configured to perform a selected functionality of dental appliance 16. The selected functionality may include, for example, a selected tooth movement. The characteristics of the features may include the size, shape, scale, position, and/or orientation of the features. In some examples, feature manager 158 may determine the characteristics of the features based on one or more rules. The rules may be pre-programmed, or machine generated, for instance, via machine learning.

In some examples, the one or more rules may be based on determined translational forces and/or determined rotational forces of dental appliance 16. For example, in response to a determined translational force being below a selected threshold value, e.g., the threshold being a force sufficient to cause alveolar bone remodeling, feature manager 158 may determine that dental appliance 16 should include a bendable flap of a particular size and shape at a particular position and orientation on dental appliance 16. As another example, in response to a determined rotational force being below a selected threshold value, e.g., the threshold being a force sufficient to cause alveolar bone remodeling, feature manager 158 may determine that dental appliance 16 should include two opposing bendable flaps of a particular size and shape at a particular position and orientation to cause a couple configured to provide sufficient rotational force. In other examples, combinations of features may be used to provide a desired translational force and/or rotational force to a selected tooth.

In some examples, feature manager 158 may determine the characteristics of one or more features based on preferences of practitioner 106. Practitioner library 148 may include data indicative of preferences of practitioner 106. In some examples, practitioner library 148 may include data indicating preferred types of features to achieve a desired translational force and/or rotational force. In some examples, practitioner library 148 may include data indicating a preferred material of dental appliance 16 or method of manufacturing dental appliance 16. In some examples, practitioner library 148 may include historical data indicating types of features previously used that have achieved a translational force and/or rotational force. Feature manager 158 may determine the characteristics of the features by applying the practitioner preferences to one or more rules, a simulation (e.g., Monte Carlo) or finite element analysis.

Model assembler 160 generates a digital 3D model of dental appliance 16 used to re-shape the dental anatomy (e.g., to the future dental anatomy) in response to determining the characteristics of the features of dental appliance 16. The digital model of dental appliance 16 may include a point cloud, 3D mesh, or other digital representation of dental appliance 16. In some examples, model assembler 160 stores the digital model of dental appliance 16 in dental appliance library 144. In some examples, model assembler 160 may output the digital model of dental appliance 16. For example, model assembler 160 may output the digital model of dental appliance 16 to computing device 112 of manufacturing facility 110 (e.g., via network 120) to manufacture dental appliance 16. Computing device 112 may send the digital model of dental appliance 16 to manufacturing system 114. Manufacturing system 114 manufactures dental appliance 16 according to the digital model of dental appliance 16. Manufacturing system 114 may form dental appliance 16 using any number of manufacturing techniques, such as 3D printing, thermoforming, injection molding, lost wax casting, among others. In another example, computing device 132 sends the digital model of dental appliance 16 to computing device 108 of clinic 104 for manufacturing at clinic 104.

In some examples, model assembler 160 generates a digital model of dental appliance 16 based on an existing digital model (e.g., stored in dental appliance library 146). In one example, models library 146 may include data indicative of dental appliance success criteria associated with each completed dental appliance 16, the appliance success criteria indicating, for example, manufacturing yield, practitioner and/or customer feedback or ratings, or combinations thereof. For example, model assembler 160 may utilize an existing digital model to generate a new or updated digital model of a dental appliance 16 in response to determining the appliance success criteria for the previous dental appliance 16 satisfy a threshold criteria (e.g., a threshold manufacturing yield, or a threshold practitioner rating). In one example, the existing digital model is a template or reference digital model. In such examples, model assembler 160 may generate a digital model of a dental appliance 16 based on the template digital model. For example, the template digital model may be associated with different characteristics of a potential patient's dental anatomy, such as a class or type of malocclusion of the teeth of the patient.

In one example, model assembler 160 generates a digital model of a dental appliance 16 based on an existing digital model by utilizing one or more morphing algorithms. For example, model assembler 160 may utilize morphing algorithms to interpolate appliance feature geometries. In one instance, model assembler 160 may generate a new digital model of a dental appliance 16 based on the design of the existing digital model.

Practitioner 106 may treat patient 102 at clinic 104. Initially, an orthodontic practitioner of clinic 104 generates one or more images of a dental anatomy of patient 102 using any suitable imaging technique and generates the digital dental data (e.g., a digital representation of patient's 12 tooth structure). For example, the practitioner may generate X-ray images that can be digitally scanned. Alternatively, the practitioner may capture digital images of the patient tooth structure using, for example, conventional computed tomography (CT), laser scanning, intra-oral scanning, CT scans of dental impressions, scans of dental casts poured from impressions, ultrasound instrumentation, magnetic resonance imaging (MRI), or any other suitable method of three-dimensional (3D) data acquisition. In other embodiments, the digital images may be provided using a hand-held intra-oral scanner such as the intra-oral scanner using active wavefront sampling developed by Brontes Technologies, Inc. (Lexington, Massachusetts) and described in PCT Publication No. WO 2007/084727 (Boerjes, et al.). Alternatively, other intra-oral scanners or intra-oral contact probes may be used. As another option, the digital dental data may be provided by scanning a negative impression of the teeth of patient 102. As still another option, the digital dental data may be provided by imaging a positive physical model of the teeth of patient 102 or by using a contact probe on a model of the teeth of patient 102. The model used for scanning may be made, for example, by casting an impression of the dentition of patient 102 from a suitable impression material such as alginate or polyvinylsiloxane (PVS), pouring a casting material (such as orthodontic stone or epoxy resin) into the impression, and allowing the casting material to cure. Any suitable scanning technique may be used for scanning the model, including those described above.

In addition to providing digital images by scanning the exposed surfaces of the teeth, it is possible to image non-visible features of the dentition, such as the roots of the teeth of patient 102 and the jaw bones of patient 102. In some embodiments, the digital dental data is formed by providing several 3D images of these features and subsequently "stitching" them together. These different images need not be provided using the same imaging technique. For example, a digital image of teeth roots provided with a CT scan may be integrated with a digital image of the teeth crowns provided with an intraoral visible light scanner. Scaling and registering of two-dimensional (2D) dental images with 3D dental images is described in U.S. Pat. No. 6,845,175 (Kopelman, et al.). Issued U.S. Pat. No. 7,027,642 (Imgrund, et al.), which is incorporated by reference herein, and U.S. Pat. No. 7,234,937 (Sachdeva, et al.), which is also incorporated by reference herein, describe using techniques of integrating digital images provided from various 3D sources. Accordingly, the term "imaging" as it is used herein is not limited to normal photographic imaging of visually apparent structures, but includes imaging of dental anatomies that are hidden from view. The dental anatomy may include, but is not limited to, any portion of crowns or roots of one or more teeth of a dental arch, gingiva, periodontal ligaments, alveolar bone, cortical bone, implants, artificial crowns, bridges, veneers, dentures, orthodontic appliances, or any structure that could be considered part of the dentition before, during, or after treatment.

To generate the digital dental data (e.g., a digital model of the current and/or the future dental anatomy of patient 102), a computer may transform raw data from the imaging systems into usable digital models. For example, raw data representing the shapes of teeth may include, for example, a point cloud in 3D space. The point cloud may be surfaced to create 3D object models of the dental anatomy of patient 102, including one or more teeth, gingival tissue, and other surrounding oral structure. For this data to be useful in orthodontic diagnosis and treatment, the computer may "segment" dentition surfaces to produce one or more discrete, movable 3D tooth object models representing individual teeth. The computer may further separate these tooth models from the gingiva into separate objects.

Segmentation may enable a user, e.g., practitioner 106 to characterize and manipulate the teeth arrangement as a set of individual objects. Advantageously, the computer may derive diagnostic information such as arch length, bite setting, interstitial spacing between adjacent teeth, American Board of Orthodontics (ABO) objective grading, or other dental anatomy information from these models. As a further benefit, the digital dental anatomy and digital dental appliance models may provide flexibility in the manufacturing process. By replacing physical processes with digital processes, the data acquisition step and data manipulation steps can be executed at separate locations without the need to transport stone models or impressions from one location to another. Reducing or eliminating the need for shipping physical objects back and forth can result in significant cost savings to both customers and manufacturers of customized appliances.

After generating the digital dental data, clinic 104 may store the digital dental data within a patient record in a database. Clinic 104 may, for example, update a local database having a plurality of patient records. Alternatively, computing device 108 outputs the digital dental data to another computing device, such as computing device 132 and/or computing device 112. Computing device 132 of force measurement system 130, computing device 108 of clinic 104, and computing device 112 of manufacturing facility 110 may be communicatively coupled to one another via network 120. Network 120 may include a wired or wireless network, such as via WIFI®, BLUETOOTH®, 3G, 4G LTE, 5G, and the like. After the digital dental data is stored, clinic 104 electronically communicates the digital dental data to manufacturing facility 110. Alternatively, manufacturing facility 110 may retrieve the digital dental data from the central database. Alternatively, manufacturing facility 110 may retrieve the preexisting digital dental data from a data source unassociated with clinic 104.

Clinic 104 may also forward a virtual treatment plan conveying general information regarding a practitioner's diagnosis and treatment plan for patient 102 to manufacturing facility 110. In some examples, the virtual treatment plan may be more specific. For example, the digital dental data may be a digital representation of the dental anatomy of patient 102. Practitioner 106 may review the digital representation and indicate at least one of desired movements, spacing, or final positions of individual teeth of patient 102. For example, the desired movements, spacing, and final positions of individual teeth of patient 102 may affect the forces to be applied to the teeth of patient 102 at each stage of treatment by each removable dental appliance of the set of removable dental appliances 16. As discussed above, the forces applied by each removable dental appliance 16 of the set of removable dental appliances 16 may be determined by selecting the dimensions, shapes, and positions of features of a dental appliance. The at least one of desired movements, spacing, or final positions of individual teeth of patient 102 may enable one or more of practitioner 106, a technician at manufacturing facility 110, computing device 112, or computing device 132 to determine, based on a measured translational force and/or rotational force of an existing dental appliance, at least one of selected dimensions, shapes, and positions of the features of the dental appliance to be manufactured. In this way, the digital dental data may include at least one of practitioner, technician, or computer selected dimensions, shapes, and positions of features of dental appliances of the set of removable dental appliances to result in the desired movement of the teeth of patient 102. Following review of the digital representation, the digital dental data that includes the selected dimensions, shapes, and positions of the features of each removable dental appliance of the set of removable dental appliance, may be forwarded to manufacturing facility 110. Manufacturing facility 110 may be located off-site, or located with clinic 104.

For example, each clinic 104 may act as manufacturing facility 110 such that a treatment plan and digital design may be performed entirely by a clinical practitioner, or an assistant, in the clinical setting, using software installed locally. The manufacturing may be performed in the clinic, as well, by using a 3D printer (or by other methods of additive manufacturing). A 3D printer allows manufacturing of intricate features of a dental appliance or a physical representation of the dental anatomy of patient 102 through additive manufacturing. The 3D printer may use iterative digital designs of original dental anatomy of patient 102 as well as a desired dental anatomy of patient 102 to produce multiple digital appliances and/or digital appliance patterns customized to produce the desired dental anatomy of patient 102. In some examples, other methods of additive manufacturing may include, for example, fused deposition modeling using a 5- or 6-axis cartesian robot or articulating arm robot to dispense material onto the surface of a removable dental appliance after thermoforming, 3D printing, and/or milling the dental appliance. Manufacturing may include post-processing, such as milling, to remove uncured resin and remove support structures, or to assemble various components, which may also be necessary and could also be performed in a clinical setting.

Manufacturing facility 110 utilizes the digital dental data of patient 102 to construct the set of dental appliances (e.g., including an ordered set of dental appliances, such as dental appliance 16 illustrated in FIG. 1) to reposition teeth of patient 102. Sometime thereafter, manufacturing facility 110 forwards the set of dental appliances to clinic 104 or, alternatively, directly to patient 102. For example, the set of dental appliances may be an ordered set of dental appliances. Patient 102 then wears each of the dental appliances in the set of dental appliances sequentially over time according to a prescribed schedule to reposition the teeth of patient 102. For example, patient 102 may wear each dental appliance in the set of dental appliances for a period of between about 1 week and about 6 weeks, such as between about 2 weeks and about 4 weeks, or about 3 weeks. Optionally, patient 102 may return to clinic 104 for periodic monitoring of the progress of the treatment with dental appliances 16.

During such periodic monitoring, a clinician may adjust the prescribed schedule of patient 102 for wearing the dental appliances in the set of dental appliances sequentially over time. In some examples, monitoring may include measuring of translational forces and/or rotational forces applied by dental appliance 16 to the teeth of the patient by updating model dental arch 12 as the teeth of patient 102 move, and remeasuring the translational forces and/or rotational forces applied by dental appliance 16 to generate updated digital dental data. In some examples, monitoring may include visual inspection of the teeth of patient 102 and may also include imaging to generate updated digital dental data. In some examples, practitioner 106 may interrupt the treatment of patient 102 with the set of dental appliances, for example, by sending the newly generated digital dental data to manufacturing facility 110 in order to produce a new set of dental appliances. In some examples, practitioner 106 may send newly generated digital dental data to manufacturing facility 110 following the completion of the prescribed schedule of the treatment with dental appliances 16. In addition, following the completion of the prescribed schedule of the treatment with dental appliances 16, practitioner 106 may request a new set of dental appliances from manufacturing facility 110 to continue treatment of patient 102. In these ways, the virtual treatment plan and actual treatment plan may be updated during a course of treatment.

Techniques of this disclosure may enable a computing device to automatically determine the shape of dental appliance 16 and the placement of various features to achieve selected translational forces and/or rotational forces to result in selected movement of the teeth of the patient. In this way, the computing device may more accurately and more quickly generate a digital model of dental appliance 16. More accurately determining the shape of dental appliance 16 and the placement of the features may increase the efficacy of dental appliance 16. Determining the shape of dental appliance 16 and placement of the appliance features more quickly may enable the practitioner to correct a patient's teeth more quickly, which may improve the appearance and/or functionality of the patient's teeth, thereby potentially improving the patient experience. Additionally, reducing the time required to generate the digital model of a dental appliance 16 may reduce the cost of production and making treatment affordable for a wider set of patients.

While computing device 132 is described as automatically generating a digital model of dental appliance 16 based on a digital model of a future dental anatomy of the patient, in some examples, computing device 132 may utilize a digital model of the current dental anatomy of the patient to generate all or part of the digital model of dental appliance 16.

Figure 7:
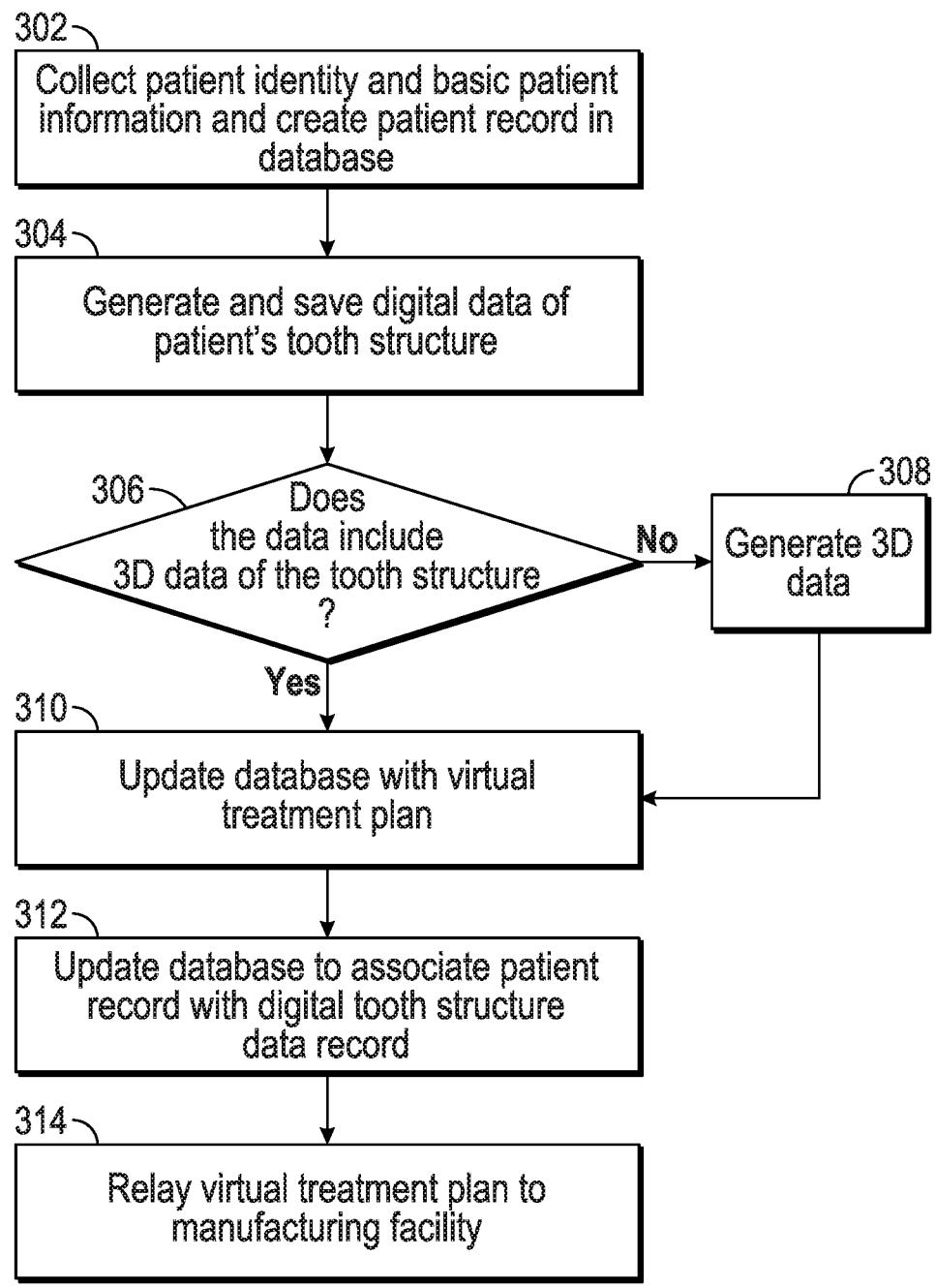
FIG. 7 is a flow diagram illustrating an example process of generating digital dental data.

FIG. 7 is a flow diagram illustrating an example process of generating digital dental data. Initially, a practitioner 106 at clinic 104 collects patient identity and other information from patient 102 and creates a patient record (302). The patient record may be stored within computing device 108 at clinic 104, which may be optionally configured to share data with computing device 112 and/or computing device 132. Alternatively, the patient record may be located within a database at manufacturing facility 110 that is remotely accessible to clinic 104 via network 120 or within a database that is remotely accessible by both manufacturing facility 110 and clinic 104.

Next, the digital dental data of patient 102 may be generated using any suitable technique (304), to thereby create a virtual dental anatomy. The digital dental data may be comprised of a 2D image and/or a 3D representation of the dental anatomy, as discussed above. Clinic 104 stores the digital dental anatomy in computing device 108 at clinic 104, or alternatively, computing device 112 at manufacturing facility 110. In some examples, computing device 108 (or 112) may processes the digital dental data to compute a digital representation of the tooth structure that may be manipulated within a 3D modeling environment. In one example, 3D representations of a dental anatomy are generated using a cone beam computerized tomography (CBCT) scanner, such as an i-CAT 3D dental imaging device (available from Imaging Sciences International, LLC; 1910 N Penn Road, Hatfield, PA).

If 2D radiological images are used (306), then the practitioner may further generate 3D digital data (308). The 3D the digital dental data may be produced by, for example, forming and subsequently digitally scanning a physical impression or casting of the tooth structure of patient 102. Alternatively, the practitioner may generate the 3D the digital dental data of the occlusal surface by use of an intra-oral scan of the dental arch of patient 102, or existing 3D tooth data. In one example, 2D radiological images and the 3D digital data for the occlusal surface of the dental arch are registered by first attaching registration markers (e.g., fiducial markers or a pedestal having known geometry) to the tooth structure of patient 102 prior to generating both the radiological images and the 3D digital scan. Thereafter, the digital representation of the registration markers within the 2D radiological image and the 3D digital data may be aligned within a 3D modeling environment. In any case, the digital data are digitally registered within the 3D modeling environment to form a composite digital representation of the dental arch of the patient, which may include the tooth crowns and roots.

In another example, 3D digital data of the tooth structure is generated by combining two 3D digital representations of the tooth structure. For example, a first 3D digital representation may be a relatively low-resolution image of the roots obtained from a CBCT scanner (e.g., an i-CAT 3D dental imaging device) and the second 3D digital representation may be a relatively high-resolution image of the crowns of the teeth obtained from an industrial CT scan of an impression or a visible light (e.g., laser) scan of a casting of the dental arch of the patient. The 3D digital representations may be registered using a software program that enables the 3D representations to be manipulated within a computer environment (e.g., Geomagic Studio software available from 3D Systems, Inc.; 333 Three D Systems Circle, Rock Hill, South Carolina).

Next, a computer system executing 3D modeling software renders a resultant digital representation of the dental arch, including the occlusal surface and/or the root structure of the patient's dental arch. Modeling software provides a user interface that allows practitioner 106 to manipulate digital representations of the teeth in 3D space relative to the digital representation of the dental arch of patient 102.

By interacting with the computer system, practitioner 106 generates a virtual treatment plan that may be used to update the database, e.g., the digital dental data stored on computing devices 108 or 112 (310). The virtual treatment plan may include, for example, diagnosis and treatment information. In some examples, the virtual treatment plan may include indications of the final positions of individual teeth of patient 102, duration of a respective stage of treatment, number of treatment stages, the direction or magnitude of forces on the teeth of patient 102 during a stage of treatment, or the like. For example, the final positions of individual teeth of patient 102, duration of a respective stage of treatment, or number of treatment stages may affect the direction or magnitude of forces on the teeth of patient 102 at each stage of treatment by each dental appliance of the set of dental appliances. As discussed above, digital dental data including measured translational forces and/or rotational forces applied by pre-existing or concurrently manufactured dental appliance 16 may be used to improve the accuracy of the design of each dental appliance 16. In this way, updating the database with the virtual treatment plan (310) may include determining or selecting by the practitioner, a technician, or automatically by a computer, based on measured translational forces and/or rotational forces, the dimensions, shapes, and positions of features of each dental appliance 16 of the set of dental appliances to result in the desired movement of the teeth of patient 102.

Once practitioner 106 has finished generating the virtual treatment plan within the 3D environment, the computer system updates the database associated with the patient record to record the virtual treatment plan as specified by practitioner 106 (312). Thereafter, the virtual treatment plan is relayed to manufacturing facility 110 to construct one or more dental appliances 16 (314).

Although described with respect to a practitioner 106 located at a clinic 104, one or more of the steps discussed with respect to FIG. 7 may be performed by a remote user, such as a user located at manufacturing facility 110. For example, practitioner 106 may only send radiological image data and an impression or casting of patient 102 to manufacturing facility 110, where a user interacts with a computer system to develop the virtual treatment plan within a 3D modeling environment. Optionally, a digital representation of the treatment plan within the 3D modeling environment may then be transmitted to practitioner 106 of clinic 104, who may review the virtual treatment plan and either send back his or her approval or indicate desired changes.

Figure 8A:
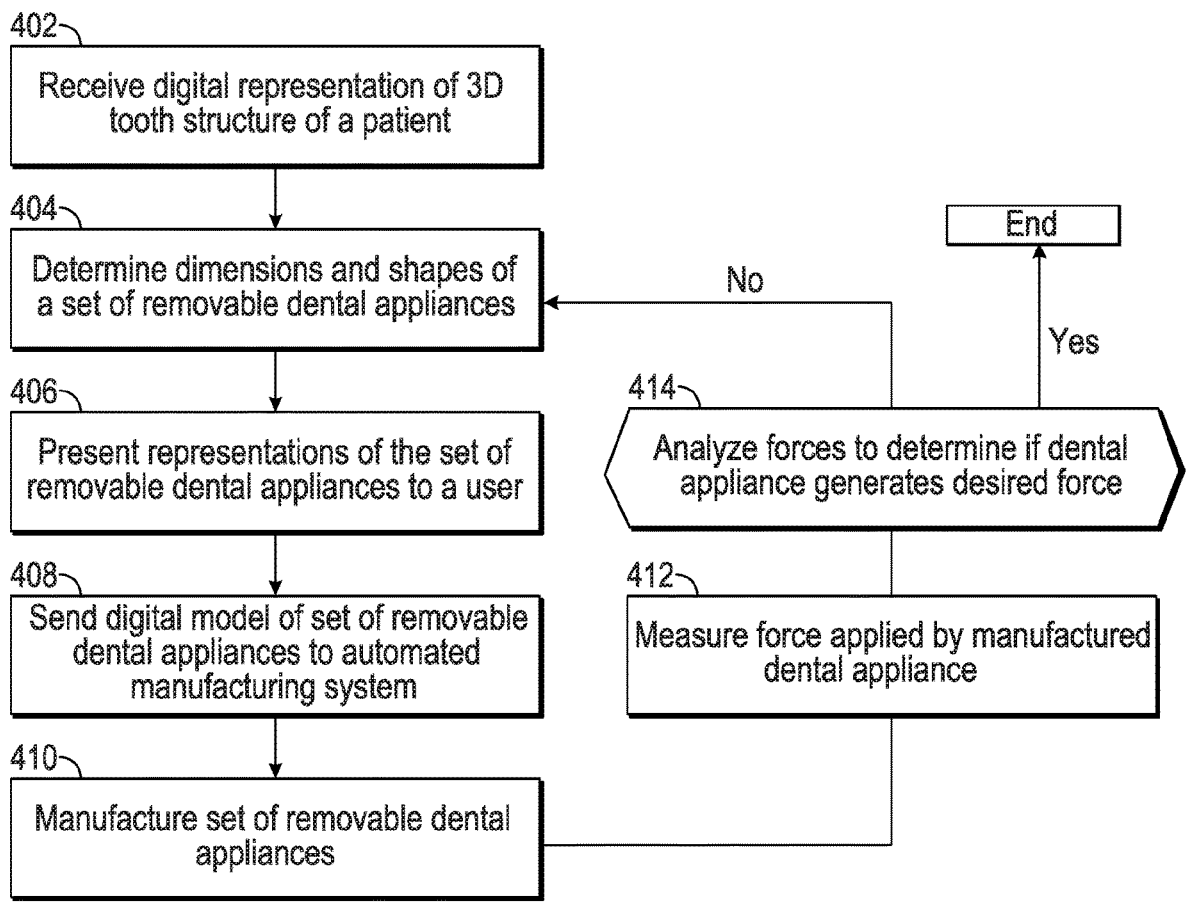
FIGS. 8A and 8B are flow diagrams illustrating an example technique conducted at a clinic and/or a manufacturing facility for manufacture of the set of dental appliances.
Figure 8B:
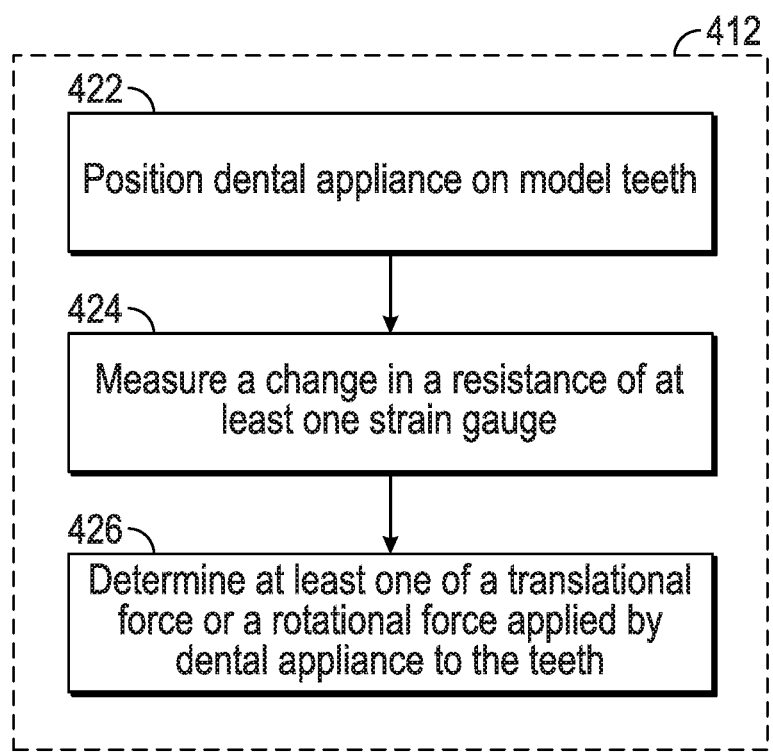

FIGS. 8A and 8B are flow diagrams illustrating an example technique conducted at clinic 104 and/or manufacturing facility 110 for manufacture of the set of dental appliances. In some examples, clinic 104 and/or manufacturing facility 110 may use force measurement system 130 to update the digital dental data and/or the virtual treatment plan during manufacture of the set of dental appliances. Initially, computing device 112 at manufacturing facility 110 receives the digital dental data including initial positions of one or more teeth of patient 102 and, optionally, an initial virtual treatment plan from clinic 104 (402). Alternatively, computing device 112 may retrieve the information from a database located within or otherwise accessible by computing device 112. A user associated with computing device 112 may interact with a computerized modeling environment running on computing device 112 to update the initial virtual treatment plan or, alternatively, develop the initial virtual treatment plan if clinic 104 has not already done so. In other examples, computing device 112 may automatically develop an initial virtual treatment plan based solely on the patient's tooth structure and predefined design constraints. Although described in reference to computing device 112, in other examples, computing device 108 or computing device 132 may be configured to perform the technique describe in reference to FIGS. 8A and 8B.

Once computing device 112 receives the digital dental data, computing device 112 determines dimensions and shapes of a dental appliance 16 for patient 102 (404). The dimensions and shapes of dental appliance 16 are configured to reposition the one or more teeth of patient 102 from their initial positions toward final positions when the dental appliance is worn by patient 102. In the same or additional examples, computing device 112 determines dimensions and shapes of the set of dental appliances for the patient configured to be worn in series.

In some examples, determining dimensions and shapes of the dental appliance includes selecting, with computing device 112, the dimensions and shapes of the dental appliance according to a set of predefined design constraints. The set of predesigned design constraints may include one or more factors, including, but not limited to, at least one of a minimum and a maximum localized force applied to one or more of the surrounded teeth, at least one of a minimum and a maximum rotational force applied to one or more of the surrounded teeth, at least one of a minimum and a maximum translational force applied to one or more of the surrounded teeth, at least one of a minimum and a maximum total force applied to one or more of the surrounded teeth, and at least one of a minimum and a maximum stress or strain applied to the dental appliance, when the dental appliance is worn by the patient and the surrounded teeth are in their initial positions. Minimum applied forces are necessary to cause force on the periodontal ligaments sufficient to result in bone remodeling and tooth movement.

In some examples, determining size, shape, position, and/or orientation of the features of dental appliance 16, including but not limited to shells of a dental appliance, a spring member, a bendable flap, a jumper, a spring bellows, an interproximal reinforcement, a gingival ridge, or other features of orthodontic appliances. Each feature of dental appliance 16 may be selected to provide a stiffness suitable to reposition the one or more teeth of the patient from their initial positions to final positions when dental appliance 16 is worn by patient 102. In some examples, computing device 112 may further select a material of dental appliance 16 according to the predefined design constraints.

The size, shape, position, and/or orientation of the features of dental appliance 16 may be presented to a user via a user interface (e.g., user interface device 138) (406). In some examples, the user may adjust the design constraints or directly adjust the size, shape, position, and/or orientation of the features of dental appliance 16 before the design data is sent to manufacturing system 114. In some examples, size, shape, position, and/or orientation of the features of dental appliance 16 may be presented to a user by computing device 112 directly as dental appliance 16 is manufactured by manufacturing system 114. For example, computing device 112 may send a digital model of dental appliance 16 to manufacturing system 114, and manufacturing system 114 manufactures dental appliance according to the digital model from computing device 112.

However, even in examples where the size, shape, position, and/or orientation of the features of dental appliance 16 may be presented to a user via a user interface of computing device 112, following user approval, computing device 112 sends a digital model of the dental appliance to manufacturing system 114 (408), and manufacturing system 114 manufactures dental appliance 16 of a set of dental appliances according to the digital model from computing device 112 (410). Manufacturing of dental appliances 16 (410) may include 3D printing, thermoforming, injection molding, lost wax casting, 5-axis milling, laser cutting, multi-axis robotic Fused Deposition Modeling (FDM), hybrid plastic and metal manufacturing techniques, such as snap-fitting, overmolding, or electroforming, as well as other manufacturing techniques.

After manufacturing dental appliance 16, the technique may include measuring forces applied by dental appliance 16 to model dental arch 12 (412). FIG. 8B is a flow diagram illustrating a technique for measuring forces applied by dental appliance 16 to model dental arch 12. As illustrated in FIG. 8B, the technique may include positioning dental appliance 16 on a plurality of model teeth 14 (422). As discussed above, teeth 14 are configured to represent at least a portion of model dental arch 12. A respective tooth of teeth 14 is coupled to a respective force sensor of force sensors 18. Each of force sensors 18 include post 24 extending from first end 28 to second end 30 along central longitudinal axis 32 and at least one strain gauge (e.g., strain gauge 26A) integrally formed on surface 36 of post 24 in strain gauge region 26 between first end 28 and second end 30. First end 28 is coupled to the respective tooth. Second end 30 is coupled to a respective recess of recesses 34 of base 20. In examples in which dental appliance 16 includes an aligner tray, positioning dental appliance 16 may include snap fitting dental appliance 16 onto teeth 14. In examples in which dental appliance 16 includes braces, positioning dental appliance 16 may include bonding brackets to teeth 14 and coupling the brackets with an archwire. In examples in which dental appliance 16 includes one or more orthodontic appliances, positioning dental appliance 16 may include using common installation technique to install the one or more orthodontic appliances to model dental arch 12.

The technique illustrated in FIG. 8B also includes receiving, by processor 136 communicatively coupled to strain gauge 26A, the signal generated by strain gauge 26A based on the deflection of post 24 (424). In examples in which strain gauge 26A includes an electrically resistive strain gauge, the signal may be indicative of a change in a resistance of strain gauge 26A. In examples in which strain gauge includes an light guide having a fiber Bragg grating, the signal may be indicative of a change in at least one of an amount of reflected light or a wavelength range of reflected light.

The technique illustrated in FIG. 8B also includes determining, by processor 136 based on the signal, at least one of a translational force or a rotational force applied by dental appliance 16 to the respective tooth of teeth 14 (426). In some examples, determining at least one of the translational force or the rotational force may include applying a three dimensional affine transform to associate the signal with at least one of the translational force or the rotational force.

In some examples, determining at least one of the translational force or the rotational force may include using machine learning to associate the signal with at least one of the translational force or the rotational force. For example, the technique may include inputting into a neural network the signal. The neural network may include one or more trainable or adaptive algorithms. The algorithms may use one or more rules as nodes in the neural network. The one or more rules may be determined or adjusted using a training set of inputs and desired outputs, along with one or more learning rules, such as a back-propagation learning rule. The back-propagation learning rule may use one or more error measurements comparing the desired output to the output produced by the algorithms to train the algorithms by varying the parameters to minimize the one or more error measurements. As one example, a training set may include a plurality of known forces applied to a force sensor and respective signals generated by the force sensor in response to application of each respective known force to the force sensor.

Computing device 112 may use finite element analysis (FEA) techniques to analyze measured translational forces and/or rotational forces to determine if the dental appliance 16 generates desired forces, e.g., to cause alveolar bone remodeling, or result in a selected force vector and/or a selected direction vector of the force applied to a respective tooth (414). For example, computing device 112 may apply FEA to the digital dental data, including a solid model of the teeth of patient 102, as the modeled teeth move from their initial positions to their final positions in response to the measured forces, which represents at least one state of treatment. Computing device 112 may use FEA to select the appropriate dental appliance 16 to apply the desired forces on the teeth. For example, computing device 12 may compare the measured force or a threshold force, such as a threshold force that is greater than a force required to cause alveolar bone remodeling. In some examples, computing device 112 may use a virtual articulator to determine contact points between the teeth and dental appliance 16 throughout the movement of the modeled teeth during the treatment. Computing device 112 may apply the measured forces to the contact point via FEA to predict tooth movement during the treatment. In some examples, computing device may iteratively adjust the contact points based on the predicted movements. In some examples, computing device 12 may iteratively determine a predicted force based on the measure force and the predicted movements and/or determined or adjusted contact points. Computing device 112 may further include occlusal contact forces, such as cusp interdigitation forces, in the FEA forces analysis in combination with forces from the dental appliance during the design of dental appliances in an ordered set of dental appliances. Computing device 112 may further determine an order in which teeth are to be moved to optimize the application of forces, reduce treatment time, improve patient comfort, or the like.

If the analyzed force is sufficient to cause alveolar bone remodeling and/or a selected force or direction vector (YES), the analysis may end, and the manufactured set of removable dental appliances may be used for the treatment. If the analyzed force is not sufficient to cause alveolar bone remodeling and/or a selected force or direction vector (NO), any one or more of steps 404, 406, 408, 410, and 412 may be repeated to produce an adjusted set of removable dental appliances.

In examples in which strain gauge 26A includes a plurality of strain gauges (e.g., strain gauges 26A-26F), each respective strain gauge may be selectively oriented on the post to detect deflection of the post in six degrees of freedom. Each respective strain gauge also may be configured to generate a respective signal of a plurality of signals in response to a deflection of the post. Hence, determining at least one of the translational force or the rotational force may include associating each respective signal of the plurality of signals with the respective strain gauge of the plurality of strain gauges to determine the deflection of the post in six degrees of freedom.

In examples in which strain gauge 26A includes a first strain gauge array that includes one or more strain gauges disposed at a first axial position relative to central longitudinal axis 32 and a second strain gauge array that includes one or more strain gauges disposed at a second axial position relative to the central longitudinal axis, determining at least one of the translational force or the rotational force may include determining at least one of a first translational force and/or a first rotational force (e.g., the "first forces") at the first strain gauge array, and determining at least one of a second translational force and/or a second rotational force (e.g., the "second forces") at the second strain gauge array. In some examples, the technique may further include comparing the first forces to the second forces. In some examples, the technique may include determining, based on the comparison of the first forces to the second forces, a compound bend of post 24.

In some examples, the technique also may include calibrating the at least one force sensor. For example, calibrating force sensor 18 may include applying a first selected force to first end 28 of post 24 to cause a first deflection of post 24; receiving, by processor 136, a first signal generated by force sensor 18 in response to the first deflection; and storing, by processor 136, the first selected force and the first signal in a lookup table as a representation of a function that relates the force to the signal. The calibration may be repeated for a plurality of forces. For example, the calibration may include applying a second selected force that is different than the first selected force to first end 28 of post 24 to cause a second deflection of post 24; receiving, by processor 136, a second signal generated by force sensor 18 in response to the second deflection; and storing, by processor 136, the second selected force and the second signal in a lookup table.

In some examples, calibrating may include coupling a test member to first end 28 of post 24. For example, the test member may be coupled to first end 28 prior to coupling a respective tooth of teeth to first end 28. The test member may be configured to more predictably transmit a force to post 24. For example, the test member may include a spherical test member.

Figure 9:
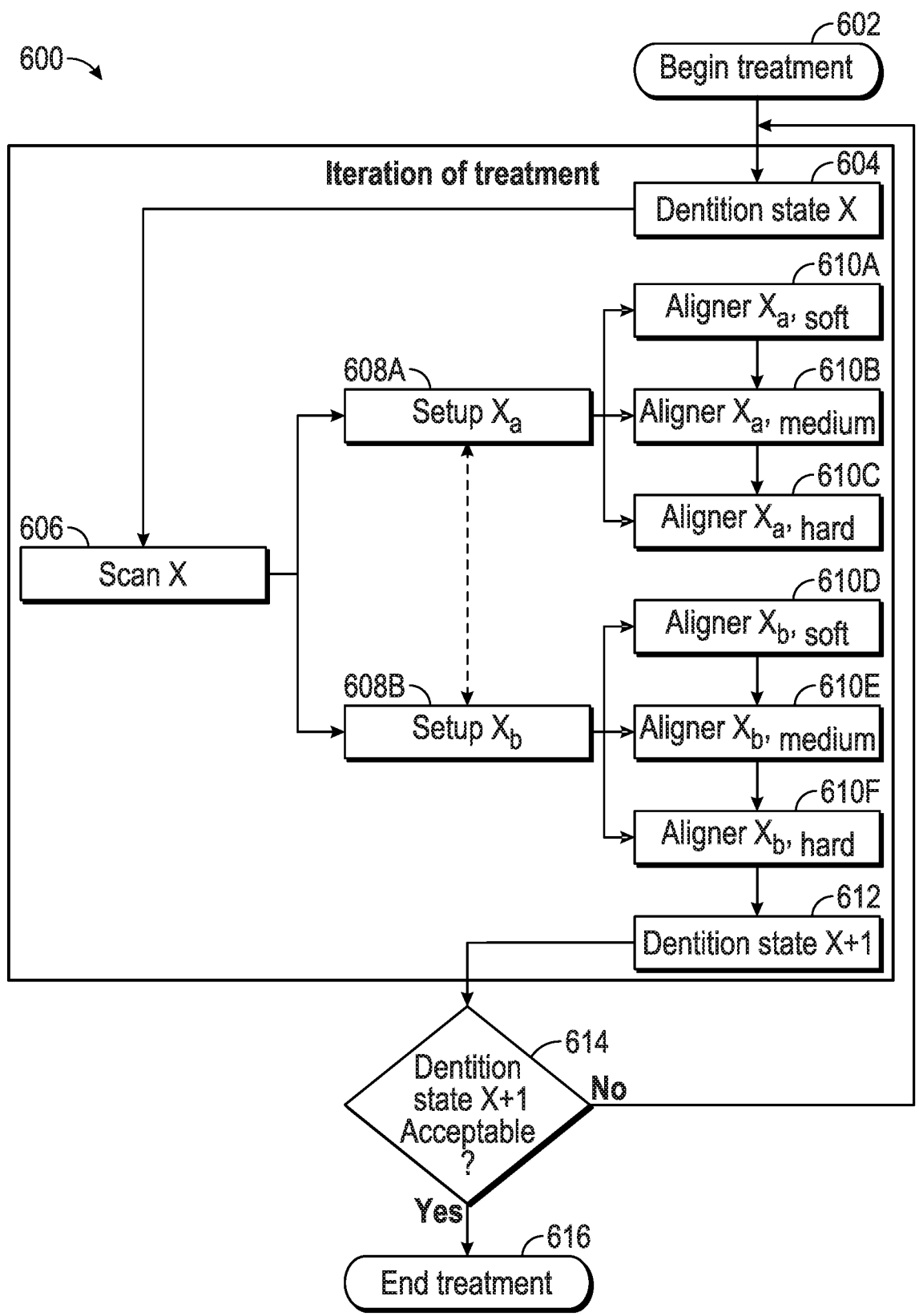
FIG. 9 is a flow diagram illustrating successive iterations of treatment using an ordered set of dental appliances.

FIG. 9 is a flow diagram 600 illustrating successive iterations of treatment using an ordered set of dental appliances. The ordered set of dental appliances is configured to reposition one or more teeth of a patient. In some examples, the ordered set of dental appliances may include dental appliance 16.

Treatment begins with the first iteration of treatment (602). At the beginning of the first iteration of treatment, the patient's teeth are at their initial positions as represented by detention state X (604). A scan of the patient's teeth, for example, as described above with respect to FIG. 6, are taken to facilitate the design of the ordered set of dental appliances (606). From the scan of patient's teeth, a computer, e.g., computing device 50, determines two different setups, first setup Xa 608A and second setup Xb 608B, that include different sizes, shapes, positions, and/or orientations of the features of each dental appliance in the ordered set. The computer may determine first setup Xa 608A and second setup Xb 608B by first adjusting the digital model of the teeth to create a model of the final position of the teeth following an initial virtual treatment plan. Then, the computer may determine the sizes, shapes, positions, and/or orientations of the features of each dental appliance in the ordered set based on predetermined translational forces and/or rotational forces applied by each dental appliance to the teeth and, optionally, the time and forces required to move the teeth from the initial positions to the final positions. For example, the computer model may adjust the sizes, shapes, positions, and/or orientations of the features of the dental appliances in the ordered set to result in a predicted translational forces and/or rotational forces applied by each dental appliance to the teeth to move the teeth from the initial positions to the final positions. The modeled forces applied by dental appliances in the ordered set may further be based on the incremental positional movements of the teeth during the treatment. In this manner, the computer may design each of the dental appliances in the ordered set according to predicted forces applied on the teeth in the predicted positions of the teeth at the time during the treatment each dental appliance of the ordered set of dental appliances is to be worn by the patient.

In some examples, at least one, such as three, different dental appliances in the set of dental appliances can be manufactured using each of first setup Xa 608A and second setup Xb 608B to produce at least two, such as six, dental appliances in the set of dental appliances. For example, first setup Xa 608A may be used to manufacture first aligner Xa, SOFT 610A, second aligner Xa, MEDIUM 610B, and third aligner Xa, HARD 610C; and second setup Xb 608B may be used to manufacture fourth aligner Xb, SOFT 610D, fifth aligner Xb, MEDIUM 610E, and sixth aligner Xb, HARD 610F. First, second, and third aligners 610A to 610C may be substantially the same shape and dimensions, but may include materials with different stiffness characteristics. For example, the second and third aligners 610B and 610C may have higher stiffness characteristics than first aligner 610A, and third aligner 610C may have higher stiffness characteristics than second aligner 610B. Similarly, the fourth, fifth, and sixth aligners 610D to 610F may have substantially the same features, but include materials with different stiffness characteristics. In some examples, first aligner 610A may have the same stiffness characteristics as the fourth aligner 610D, such as a relatively soft polymeric material. Similarly, second aligner 610B may have the same stiffness characteristics as the fifth aligner 610E, such as a relatively stiffer polymeric material than first aligner 610A. Likewise, third aligner 610C may have the same stiffness characteristics as the sixth aligner 610F, such as a relatively stiffer polymeric material than second aligner 610B.

Aligners 610A to 610F in the ordered set of dental appliances may be worn in sequence over time by the patient. For example, each of aligners 610A to 610F in the ordered set of dental appliances may be worn between about 1 week and about 6 weeks, such as between about 2 weeks and about 4 weeks, or about 3 weeks. Following the treatment plan using aligners 610A to 610F, the patient's teeth may be at their final positions for the first iteration of treatment as represented by detention state X+1 (612).

Once patient's teeth are at or near dentition state X+1, the patient may return to the clinician who may evaluate the result of the first iteration of treatment (614). If the first iteration of treatment has resulted in acceptable final positions of the patient's teeth, then the treatment may be ended (616). However, if the first iteration of treatment did not result in acceptable final positions of the patient's teeth, one or more additional iterations of treatment may be performed. To begin the next iteration of treatment, the clinician may take another scan of the patient's teeth to facilitate the design of a subsequent ordered set of dental appliances (606). In some examples, evaluation of the result of the first iteration of treatment may include taking another scan of the patient's teeth, in which case beginning the next iteration of treatment may simply involve forwarding the digital model of the patient's teeth to a manufacturing facility so that another ordered set of dental appliances may be manufactured for the patient based on the new positions of the patient's teeth. In yet other examples, the newly acquired scan may be used to create one or more iterations of dental appliances in the clinician's facility.

The techniques of FIG. 9 represent one specific example, and a variety of modifications may be made to the techniques of FIG. 9 within the spirit of this disclosure. For example, an ordered set of dental appliances may include more or less than six dental appliances. As another example, each dental appliance in the ordered set of dental appliances may have unique features, and each dental appliance in the ordered set of dental appliances may be made of material having substantially the same or similar stiffness characteristics.

Figure 10:
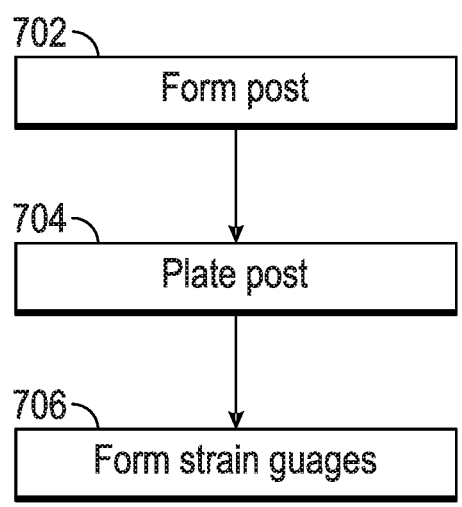
FIG. 10 is a flow diagram illustrating an example technique of forming the example force sensors illustrated in FIG. 1.

The force sensors described herein may be formed using any suitable technique. FIG. 10 is a flow diagram illustrating an example technique of forming force sensors, such as force sensors 18. Although the technique is described in reference to force sensors 18 described in reference to FIGS. 1-4C, the technique may be used to form other force sensors, and force sensors 18 may be formed using other techniques.

The technique illustrated in FIG. 10 includes forming post 24 (702). For example, in examples in which post 24 includes a polymer, forming post 24 may include injection molding, milling, or other techniques for forming polymeric materials. In examples in which post 24 includes a ceramic, forming post 24 may include sintering, milling, or other technique for forming ceramic materials. In examples in which post 24 includes two or more materials, such as for example a nonconductive material of at least strain gauge region 26 and a relatively more rigid material (e.g., compared to the nonconductive material) from strain gauge region 26 to each of first end 28 and second end 30, forming post 24 may include coating the nonconductive material with the relatively more rigid material or, alternatively or additionally, mechanically coupling the nonconductive material to the relatively more rigid material.

The technique illustrated in FIG. 10 also includes plating post 24 (704). In some examples, plating post 24 may include plating post 24 with a conductive material to define a conductive surface. In examples in which post 24 includes a nonconductive material, plating may include electroless plating the nonconductive material of post 24 with a first conductive material, such as copper, nickel, or other metal, and subsequently electroplating the first conductive material with a second conductive material, such as copper, nickel, or other metal. In the same or other examples, forming post 24 (702) may include fabricating the post from a metal or semiconductor, such as aluminum, stainless steel, silicon carbide, tungsten, or silicon, and subsequently coating the post with a nonconductive material, such as silica, alumina, zirconia, parylene, PTFE, or some other metal oxide or polymer using any suitable process, e.g., chemical vapor deposition, oxidation, passivation, anodization, sputter deposition, pulsed laser deposition, etc.

In some examples, the strain gauge array may be embedded in the post below its outer surface by adding a greater amount of non-conductive material to the surface of post 24 over the electrically conductive material comprising the one or more strain gauges 18. As one example, a thick coating can be made by repeated spray coating or dip coating in a polymer resin, followed by curing after each or several applications, then machining the outer surface of the post to greater precision and known dimensions. Other methods of embedding the strain gauge array in the post might include immersing a preformed strain gauge array in a mold of liquid polymer resin, such as epoxy, light-cured polymer resin, or heat-cured polymer resin, or setting a preformed strain gauge array in a plastic injection mold prior to hot plastic injection. Optionally, the stiffness of the post may be modified, such as increased, by inserting a glass, ceramic, or metal rod into the mold cavity prior to polymer introduction to incorporate a more rigid core into the post structure. In such examples, especially those involving metal or semiconductor cores, the strain gauge array might be offset radially from the outer surface of the core to allow the polymer to flow between them and form a nonconductive layer. This nonconductive layer serves as electrical insulation between the electrically conductive strain gauge material and the conductive core material.

The technique illustrated in FIG. 10 also includes removing at least a portion of the plated surface to form at least one strain gauge in strain gauge region 26 between first end 28 and second end 30 of post 24. For example, removing the portion of the plated surface may include ablating, by a laser, the portion of the plated surface.

Various examples have been described. These and other examples are within the scope of the following claims.

What is claimed is:

1. A system comprising:
   a plurality of model teeth configured to represent at least a portion of a dental arch and receive a dental appliance;
   a plurality of posts, each respective post extending from a first end to a second end along a central longitudinal axis, the first end of each respective post coupled to a respective tooth of the plurality of model teeth;
   at least one strain gauge integrally formed on a surface of each respective post between the first end and the second end, the at least one strain gauge configured to generate a signal in response to a deflection of the post;
   a base defining a plurality of recesses, each recess configured to receive the second end of a respective post of the plurality of posts, wherein each respective post is positioned between the base and a respective model tooth to provide a direct force transmission path; and
   a processor coupled to the at least one strain gauge, the processor configured to determine, based on the signal from the at least one strain gauge, at least one of a translational force or a rotational force applied by the dental appliance to the respective tooth of the plurality of model teeth.

2. The system of claim 1, wherein each post of the plurality of posts comprises a nonconductive material.

3. The system of claim 1, wherein each strain gauge comprises at least one electrically resistive strain gauge formed on a surface of respective post of the plurality of posts.

4. The system of claim 1, wherein each strain gauge comprises a light guide having a fiber Bragg grating, and wherein the system further comprises a light source optically coupled to the light guide.

5. The system of claim 1, wherein each post of the plurality of posts comprises a plurality of strain gauges, each strain gauge of the plurality of strain gauges selectively oriented on the post to detect, by the plurality of strain gauges, deflection of the post in six degrees of freedom.

6. The system of claim 1, wherein each post of the plurality of posts comprises:
   a first strain gauge, a second strain gauge, and a third strain gauge, each extending in an axial direction parallel to the central longitudinal axis and disposed about 120-degrees apart about the central longitudinal axis of the post; and
   at least one fourth strain gauge oriented diagonally at an angle between about 30-degrees and 60-degrees relative to the central longitudinal axis.

7. The system of claim 1, wherein each post of the plurality of posts comprises:
   a first strain gauge array comprising one or more strain gauges disposed at a first axial position relative to the central longitudinal axis; and
   a second strain gauge array comprising one or more strain gauges disposed at a second axial position relative to the central longitudinal axis.

8. The system of claim 1, wherein an amount of deflection of each post in response to the translational force or the rotational force applied by the dental appliance to the respective tooth of the plurality of model teeth is substantially similar to a second amount of deflection a tooth of a patient in response to the translational force or the rotational force applied by the dental appliance to the tooth of the patient when worn on the teeth of the patient.

9. The system of claim 1, wherein at least one of the first end and second end of each post is configured to have substantially zero deflection relative to the respective tooth in response to a force applied to the tooth by the dental appliance.

10. The system of claim 1, wherein at least a portion of each post between the first end and the second end defines a neck, wherein deflection of each post in response to a force applied to the respective tooth by the dental appliance occurs at the neck, and wherein is disposed on the neck.

11. The system of claim 1, wherein a depth of each respective recess of the plurality of recesses is selected to position each respective tooth to represent the dental arch.

12. A method comprising:
   positioning a dental appliance on a plurality of model teeth configured to represent at least a portion of a dental arch, wherein at least two teeth of the plurality of model teeth are each coupled to a respective force sensor comprising:
      a post extending from a first end to a second end along a central longitudinal axis, the first end of the post coupled to a respective tooth of the at least two teeth; and
      at least one strain gauge integrally formed on a surface of the post between the first end and the second end, the at least one strain gauge configured to generate a signal in response to a deflection of the post,
      wherein the second end of the post is coupled to a recess of a base; and
   receiving, by a processor coupled to the at least one strain gauge, the signal generated by the at least one strain gauge based at least in part on the deflection of the post; and
   determining, by the processor based at least in part on the signal, at least one of a translational force or a rotational force applied by the dental appliance to the respective tooth of the at least two teeth.

13. The method of claim 12, wherein the at least one strain gauge comprises an electrically resistive strain gauge, and wherein the signal is indicative of a change in a resistance of the at least one strain gauge.

14. The method of claim 12, wherein the at least one strain gauge comprises a light guide having a fiber Bragg grating, and wherein transmission of light emitted by a light source through the light guide causes the signal to indicate a change in at least one of an amount of reflected light or a wavelength range of reflected light.

15. The method of claim 12, wherein each force sensor comprises a plurality of strain gauges, each strain gauge selectively oriented on a respective post and configured to generate a respective signal in response to a deflection of the post, and wherein determining at least one of the translational force or the rotational force comprises associating each respective signal with the corresponding strain gauge to determine the deflection of the respective post in six degrees of freedom.

16. The method of claim 12, wherein each force sensor comprises:
   a first strain gauge array comprising one or more first strain gauges disposed at a first axial position relative to the central longitudinal axis of a respective post; and
   a second strain gauge array comprising one or more second strain gauges disposed at a second axial position relative to the central longitudinal axis of the respective post,
   wherein determining at least one of the translational force or the rotational force comprises:
      determining at least one of a first translational force or a first rotational force based on signals from the first strain gauge array; and
      determining at least one of a second translational force or a second rotational force based on signals from the second strain gauge array.

17. The method of claim 12, further comprising calibrating each force sensor, wherein calibrating each force sensor comprises:
   applying a first selected force to the first end of the respective post to cause a first deflection of the post;
   receiving, by the processor, a first signal generated by a strain gauge in response to the first deflection;
   storing, by the processor, a representation of a function that relates the first selected force to the first signal;
   applying a second selected force to the first end of the respective post to cause a second deflection of the post, the second selected force being different than the first selected force;
   receiving, by the processor, a second signal generated by the strain gauge in response to the second deflection; and
   storing, by the processor, a representation of a function that relates the second selected force to the second signal.

18. The system of claim 1, further comprising a suspension system mechanically coupled to the base, the suspension system including one or more vibration dampening components configured to reduce transmission of ambient vibrations to the base.

19. The system of claim 1, wherein the processor is further configured to generate or update a digital model of a dental appliance based at least in part on the determined translational force or rotational force, the digital model including one or more features selected to achieve a target tooth movement.

20. The system of claim 1, wherein the processor is further configured to compare the determined translational force or rotational force with a predicted force generated by a virtual model of the dental arch and calibrate at least one of the virtual model or the system based on the comparison.

* * * * *